US012663751B2

(12) United States Patent
Iriyama et al.

(10) Patent No.: US 12,663,751 B2
(45) Date of Patent: Jun. 23, 2026

(54) IMAGE FORMING APPARATUS HAVING REMOVABLE FIXING DEVICE

(71) Applicant: BROTHER KOGYO KABUSHIKI KAISHA, Nagoya (JP)

(72) Inventors: Shota Iriyama, Toyokawa (JP); Daisuke Ishizuka, Nagoya (JP); Hirotaka Imaeda, Nagoya (JP); Tokifumi Tanaka, Komaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/943,675

(22) Filed: Nov. 11, 2024

(65) Prior Publication Data

US 2025/0164923 A1 May 22, 2025

(30) Foreign Application Priority Data

Nov. 16, 2023 (JP) ................................ 2023-195439
Nov. 16, 2023 (JP) ................................ 2023-195444
Nov. 16, 2023 (JP) ................................ 2023-195449

(51) Int. Cl.
*G03G 15/20* (2006.01)
*G03G 21/16* (2006.01)

(52) U.S. Cl.
CPC ....... *G03G 21/168* (2013.01); *G03G 15/2064* (2013.01); *G03G 2221/1639* (2013.01); *G03G 2221/1654* (2013.01)

(58) Field of Classification Search
USPC .......................................................... 399/110
See application file for complete search history.

(56) References Cited

U.S. PATENT DOCUMENTS 6,647,215 B1 11/2003 Ogle et al.
2009/0263155 A1 10/2009 Murano
2013/0004203 A1 1/2013 Ohnishi
2020/0133195 A1 * 4/2020 Ohta ................. G03G 21/1685

FOREIGN PATENT DOCUMENTS

JP S63-002970 U 1/1988
JP H7-092846 A 4/1995
JP 2002-229373 A 8/2002
JP 2003-241615 A 8/2003
JP 2004-046211 A 2/2004
JP 2005-338642 A 12/2005
(Continued)

*Primary Examiner* — Quana Grainger
(74) *Attorney, Agent, or Firm* — Merchant & Gould P.C.

(57) ABSTRACT

An image forming apparatus includes a main housing and a fixing device. The fixing device is installable into the main housing in a first direction perpendicular to a longitudinal direction of the fixing device. The fixing device includes a handle on one side in the first direction, and is configured to rotate relative to the main housing, as an end of the handle on the one side in the first direction is moved toward one side in a second direction that is perpendicular to the longitudinal direction and to the first direction. The handle has a first inclined surface at an end thereof on another side in the second direction. The inclined surface is inclined such that an edge thereof on the one side in the first direction is located further to the another side in the second direction than an edge thereof on another side in the first direction.

20 Claims, 14 Drawing Sheets

(56) References Cited

FOREIGN PATENT DOCUMENTS

| | | | |
|---|---|---|---|
| JP | 2009-258457 | A | 11/2009 |
| JP | 2012-008441 | A | 1/2012 |
| JP | 2013-011822 | A | 1/2013 |
| JP | 2016-75752 | A | 5/2016 |
| JP | 2017-203944 | A | 11/2017 |

* cited by examiner

IMAGE FORMING APPARATUS HAVING REMOVABLE FIXING DEVICE

REFERENCE TO RELATED APPLICATIONS

This application claims priority from Japanese Patent Application Nos. 2023-195439, 2023-195444, and 2023-195449 filed on Nov. 16, 2023. The entire contents of the priority applications are incorporated herein by reference.

BACKGROUND ART

An image forming apparatus known in the art includes a main housing and a fixing device installable into and removable from the main housing. In such an image forming apparatus, the fixing device includes a handle at an upstream end thereof in a direction in which the fixing device is installed into the main housing. The handle is graspable when installing and removing the fixing device.

Further, in such an image forming apparatus, the main housing has a guide groove and the fixing device includes a guide rib. The guide groove of the main housing extends in a front-rear direction. The guide rib of the fixing device protrudes in a lateral direction. The guide rib is engaged with the guide groove when the fixing device is installed into the main housing. The guide groove has an inlet and an inclined guide portion at an inlet-side end thereof. The inlet is widened by the inclined guide portion in the up-down direction. When the fixing device is installed into the main housing, the guide rib is guided into the guide groove by the inclined guide portion.

SUMMARY

In an image forming apparatus in which a fixing device is installable into and removable from a main housing, it is desirable to improve operability in the process of installing and removing the fixing device.

In one aspect, an image forming apparatus disclosed herein comprises a main housing and a fixing device.

The fixing device comprises a heating member and a pressure member. The fixing device is installable into the main housing in a first direction that is perpendicular to a longitudinal direction of the fixing device from one side in the first direction to the other side in the first direction, and is removable from the main housing in the first direction from the other side in the first direction to the one side in the first direction.

The fixing device further comprises a handle at an end thereof on the one side in the first direction.

The handle is graspable when the fixing device is being installed into and removed from the main housing.

The fixing device is configured to rotate relative to the main housing from a first position in which the fixing device is installed in the main housing to a second position different from the first position, as an end of the handle on the one side in the first direction is moved toward one side in a second direction that is perpendicular to the longitudinal direction and to the first direction.

The handle has a first inclined surface at an end thereof on the other side in the second direction.

The first inclined surface is inclined such that an edge of the first inclined surface on the one side in the first direction is located further to the other side in the second direction than an edge of the first inclined surface on the other side in the first direction in a state where the fixing device is located in the first position.

Since the handle has the first inclined surface, the handle can be easily moved toward the one side in the second direction and easily pulled from the other side to the one side in the first direction by applying a force on the first inclined surface when removing the fixing device from the main housing. Thus, operability in the process of installing and removing the fixing device can be improved.

The fixing device may further comprise a fixing housing configured to support the heating member and the pressure member, and the handle may be fixed to the fixing housing.

Since the handle is fixed to the fixing housing, the entire fixing device can be rotated and/or moved in the first direction by operating the handle.

The fixing device may further comprise a positioning boss extending in the longitudinal direction, and the fixing housing may comprise a recess.

The positioning boss is located in the recess in a state where the fixing device is located in the first position.

The fixing device is movable in the first direction relative to the main housing in a state where the fixing device is located in the second position.

Since the positioning boss of the fixing device enters the recess of the main housing in a state where the fixing device is located in the first position, the fixing device can be restrained from moving relative to the main housing in the state where the fixing device is located in the first position. Since the fixing device is movable in the first direction relative to the main housing after the fixing device is rotated from the first position to the second position, the fixing device can be removed from the main housing in a state where the fixing device is located in the second position.

The handle may include a grip that is graspable.

The grip extends in the second direction in a state where the fixing device is located in the first position.

Since the handle includes the grip, a user can place his/her hand on the grip to operate the handle. Thus, operability in the process of installing and removing the fixing device can be improved.

The main housing may have a guide surface including a first guide surface and a second guide surface.

The guide surface guides the positioning boss toward the recess when the fixing device is being installed into the main housing.

The first guide surface extends in the first direction.

The second guide surface is located between the first guide surface and the recess. The second guide surface is inclined such that an edge of the second guide surface on the one side in the first direction is located further to the one side in the second direction than an edge of the second guide surface on the other side in the first direction.

Since the second guide surface, which is located between the first guide surface and the recess, is inclined such that the edge of the second guide surface on the one side in the first direction is located further to the one side in the second direction than an edge of the second guide surface on the other side in the first direction, the first guide surface and the recess can be located approximately at the same position in the second direction. Thus, the posture of the fixing device while the positioning boss is being guided by the first guide surface, and the posture of the fixing device after the positioning boss enters the recess, i.e., after installation of the fixing device, can be made approximately the same.

The handle may have a second inclined surface at the end thereof on the other side in the second direction.

The second inclined surface is located further to the one side in the first direction than the first inclined surface, and is inclined such that an edge of the second inclined surface on the one side in the first direction is located further to the one side in the second direction than an edge of the second inclined surface on the other side in the first direction in a state where the fixing device is located in the first position.

Since the handle has the second inclined surface, a force from the one side to the other side in the first direction can be exerted on the positioning boss while the positioning boss is pressed against the guide surface by applying a force on the second inclined surface when installing the fixing device into the main housing. Thus, operability in the process of installing and removing the fixing device can be improved.

A dimension of the first inclined surface in the first direction may be larger than a dimension of the second inclined surface in the first direction in a state where the fixing device is located in the first position.

The fixing device may further comprises a lock lever.

The lock lever is movable between a lock position in which the lock lever is engaged with the main housing to restrain the fixing device from moving relative to the main housing in the first direction, and an unlock position in which the lock lever is disengaged from the main housing, in a state where the fixing device is located in the first position.

The lock lever is provided on the handle.

Since the lock lever is provided on the handle, the lock lever can be operated when operating the handle.

The heating member may comprise a rotatable heating body, the pressure member may comprise a rotatable pressure body, and an axis of rotation of the rotatable heating body and an axis of rotation of the rotatable pressure body may be located between one end and the other end of the handle in the second direction.

Since the rotation axes of the rotatable heating body and the rotatable pressure body, which account for a major portion of the weight of the fixing device, are located between one end and the other end of the handle in the second direction, the handle can be operated smoothly in the process of operating the handle and installing and removing the fixing device.

If an inclined guide portion is provided at an inlet-side end of a guide groove as in the image forming apparatus known in the art, a fixing device could be easily installed into a main housing. However, a dimension of the inlet-side end of the guide groove in the up-down direction would become larger, which would inhibit downsizing of an image forming apparatus.

Thus, it is also desirable to easily install the fixing device into the main housing and to downsize the image forming apparatus at the same time.

In another aspect, an image forming apparatus disclosed herein comprises a main housing and a fixing device.

The fixing device comprises a heating member and a pressure member. The fixing device is installable into the main housing in a first direction that is perpendicular to a longitudinal direction of the fixing device, from one side in the first direction to the other side in the first direction.

The main housing has a groove extending in the first direction.

The fixing device further comprises a pivot boss protruding therefrom in the longitudinal direction.

The pivot boss is configured to enter the groove in the process of the fixing device being installed into the main housing and to be located in the groove in a state where the fixing device is installed in the main housing.

The pivot boss has a shape that is elongated in the first direction.

The pivot boss has a first end on the other side in the first direction and a second end on the one side in the first direction. The first end of the pivot boss has a tapered shape with a dimension in a second direction that is perpendicular to the longitudinal direction and to the first direction. The dimension of the tapered shape in the second direction decreases as the first end of the pivot boss is elongated from the one side in the first direction to the other side in the first direction.

Since the first end of the pivot boss has a tapered shape, the pivot boss can be guided into the groove when installing the fixing device into the main housing. The fixing device can thereby be easily installed into the main housing. Further, since the pivot boss has a tapered shape, the main housing can be downsized compared to an alternative configuration in which an inclination for guiding the pivot boss into the groove is provided at an inlet of the groove. Thus, the image forming apparatus can be downsized.

The second end of the pivot boss may have a cylindrical surface contactable with an inner surface of the groove as viewed from the longitudinal direction, and the fixing device may be rotatable relative to the main housing about the second end of the pivot boss.

Since the second end of the pivot boss, which functions as a center of rotation of the fixing device, has a cylindrical surface, the fixing device can be rotated smoothly relative to the main housing.

The main housing may have a recess, and the fixing device may further comprises a positioning boss.

The recess is recessed toward one side in the second direction. The recess is located further to the other side in the first direction than the groove, The positioning boss extends in the longitudinal direction. The positioning boss is located in the recess in a state where the fixing device is installed in the main housing.

The positioning boss is configured to enter the recess as the fixing device is rotated relative to the main housing.

Since the positioning boss enters the recess when the fixing device is rotated relative to the main housing, the fixing device can be restrained from moving in the first direction relative to the main housing after the positioning boss enters the recess.

The main housing may have a guide surface including a first guide surface and a second guide surface.

The guide surface guides the positioning boss toward the recess when the fixing device is being installed into the main housing, The first guide surface extends in the first direction.

The second guide surface is located between the first guide surface and the recess. The second guide surface is inclined such that an edge of the second guide surface on the one side in the first direction is located further to the one side in the second direction than an edge of the second guide surface on the other side in the first direction.

When the fixing device is being installed into the main housing, the fixing device moves along the first direction in a process in which the positioning boss is guided by the first guide surface.

When the fixing device is being installed into the main housing, the fixing device rotates in such a manner that the positioning boss moves toward the other side in the second direction in a process in which the positioning boss is guided from the first guide surface to the second guide surface.

When the fixing device is being installed into the main housing, the fixing device rotates in such a manner that the positioning boss moves toward the one side in the second direction in a process in which the positioning boss enters the recess.

Since the second guide surface, which is located between the first guide surface and the recess, is inclined such that an edge of the second guide surface on the one side in the first direction is located further to the one side in the second direction than an edge of the second guide surface on the other side in the first direction, the first guide surface and the recess can be located approximately at the same position in the second direction. Thus, the posture of the fixing device while the positioning boss is being guided by the first guide surface, and the posture of the fixing device after the positioning boss enters the recess, i.e., after installation of the fixing device, can be made approximately the same.

When the fixing device is being installed into the main housing, at least a portion of the pivot boss may enter the groove in the process in which the positioning boss is guided by the first guide surface.

Since at least a portion of the pivot boss enters the groove in the process in which the positioning boss is guided by the first surface, the pivot boss can be reliably placed in the groove when the fixing device moves along the first direction. After at least a portion of the pivot boss enters the groove, the fixing device rotates in the process of the positioning boss being guided from the first guide surface to the second guide surface and entering the recess. Thus, the fixing device can be rotated stably.

The main housing may have a first restriction surface and a second restriction surface.

The first restriction surface contacts the fixing device from the one side in the second direction to restrain the fixing device from moving toward the one side in the second direction when the fixing device is being installed into the main housing.

The second restriction surface contacts the fixing device from the other side in the second direction to restrain the fixing device from moving toward the other side in the second direction when the fixing device is being installed into the main housing.

Since the main housing has the first restriction surface and the second restriction surface, the fixing device can be restrained from moving in the second direction by the first restriction surface and the second restriction surface. The pivot boss can thereby be reliably placed in the groove.

The groove may have a first surface and a second surface.

The first surface extends in the first direction.

The second surface extends in the first direction. The second surface faces the first surface in the second direction.

The pivot boss is located between the first surface and the second surface in a state where the fixing device is installed in the main housing.

The first end of the pivot boss is located closer to the first surface than to the second surface in a state where the fixing device is installed in the main housing.

Since the first end of the pivot boss is located closer to the first surface than to the second surface in a state where the fixing device is installed in the main housing, a space will be left for allowing the fixing device to rotate in a direction in which the first end of the pivot boss moves closer to the second surface.

The positioning boss may be located further to the other side in the first direction than the pivot boss and in a position different from a position of the pivot boss in the second direction, in a state where the fixing device is installed in the main housing.

Since the position of the positioning boss, which is located further to the other side in the first direction than the pivot boss, is different from the position of the pivot boss in the second direction, the positioning boss can be restrained from entering the groove by mistake in the process of installing the fixing device into the main housing.

In a case where the image forming apparatus known in the art is transported with the fixing device installed in the main housing, the fixing device may move out of an installation position due to, for example, vibrations during transportation.

Thus, it is also desirable to restrain the fixing device from moving from the installation position.

In yet another aspect, an image forming apparatus disclosed herein comprises a main housing and a fixing device.

The fixing device comprises a heating member and a pressure member. The fixing device is installable into the main housing in a first direction that is perpendicular to the longitudinal direction of the fixing device, from one side in the first direction to the other side in the first direction.

The main housing has a recess.

The recess is recessed toward one side in a second direction that is perpendicular to the longitudinal direction and to the first direction.

The fixing device further comprises a positioning boss extending in the longitudinal direction.

The positioning boss is located in the recess in a state where the fixing device is installed in the main housing.

The image forming apparatus further comprises a restriction element.

The restriction element is attachable to and removable from the main housing in a state where the fixing device is installed in the main housing. A portion of the restriction element is held between the main housing and the fixing device to thereby restrain the fixing device from moving relative to the main housing toward the other side in the second direction.

Since the image forming apparatus comprises the restriction element, the fixing device can be restrained from moving in a direction in which the positioning boss moves out of the recess. The positioning boss can thereby be restrained from moving out of the recess, and the fixing device can be restrained from moving from the installation position.

The fixing device may further comprise a pivot boss extending in the longitudinal direction and may be located further to the one side in the first direction than the positioning boss. The fixing device may be rotatable relative to the main housing about the pivot boss in such a manner that the positioning boss moves in the second direction.

The restriction element is located further to the one side in the first direction than the pivot boss to restrain the fixing device from rotating.

Since the pivot boss, which functions as the center of rotation of the fixing device, is located further to the one side in the first direction than the positioning boss, and the restriction element is located further to the one side in the first direction than the pivot boss to restrain the fixing device from rotating, the restriction element can be downsized.

An end of the fixing device on the one side in the first direction may include an opposing portion, and the restriction element may include an insertion portion.

The opposing portion is opposed to the main housing. The opposing portion moves closer to the main housing as the fixing device is rotated in such a manner that the positioning boss moves toward the other side in the second direction.

The insertion portion is configured to be inserted and held between the opposing portion and the main housing.

Since the restriction element includes the insertion portion, rotation of the fixing device in a direction in which the positioning boss moves out of the recess can be restrained by a simple configuration, i.e., the insertion portion inserted between the opposing portion of the fixing device and the main housing.

The restriction element may include a rib.

The rib protrudes from the insertion portion and contacts the main housing or the opposing portion. An amount of protrusion of the rib decreases from upstream in a direction of insertion of the insertion portion to downstream in a direction of insertion of the insertion portion.

Since the restriction element includes a rib that protrudes from the insertion portion and of which an amount of protrusion decreases from upstream in the direction of insertion of the insertion portion to downstream in the direction of insertion of the insertion portion, the insertion portion can be easily inserted between the opposing portion of the fixing device and the main housing. Further, if the insertion portion is forced in between the opposing portion of the fixing device and the main housing, the restriction element will not easily fall out from between the opposing portion of the fixing device and the main housing.

The rib may be comprised of a plurality of ribs provided side-by-side in the longitudinal direction.

Since the rib is comprised of a plurality of ribs provided side-by-side in the longitudinal direction, the restriction element can be restrained from tilting relative to the longitudinal direction.

The restriction element may include a lock portion.

The lock portion is engaged with the fixing device or the main housing to restrain the insertion portion from falling out from between the opposing portion and the main housing.

Since the restriction element has a lock portion configured to restrain the insertion portion from falling out from between the opposing portion and the main housing, the restriction device can be restrained from falling out.

The restriction element may be located further outward than the heating member in the longitudinal direction.

Since the restriction element is located further outward than the heating member in the longitudinal direction, the restriction element can be prevented from being adversely affected by heat generated by the heating member even if a user forgets to remove the restriction element and the image forming apparatus is used with the restriction element attached thereto.

The fixing device may comprise a fixing housing configured to support the heating member and the pressure member, and the restriction element may be a different color than the main housing and the fixing housing.

Since the restriction element is a different color than the main housing and the fixing housing, a user can easily find the restriction element when the restriction element is to be removed.

The main housing may have an opening at an end thereof on the one side in the first direction, and the fixing device may be installable into and removable from the main housing through the opening. The image forming apparatus may further comprise a cover, and the fixing device may include a handle at an end thereof on the one side in the first direction.

The cover covers and uncovers the opening.

The handle is graspable when the fixing device is being installed and removed.

The restriction element does not protrude further to the one side in the first direction than the handle as viewed from the longitudinal direction.

Since the restriction element does not protrude further to the one side in the first direction than the handle as viewed from the longitudinal direction, the restriction element and the closed rear cover do not interfere with each other.

The lock portion may be configured to extend in the direction of insertion of the insertion portion and face the insertion portion in a perpendicular direction that is perpendicular to the direction of insertion. The lock portion may include a pawl, and the restriction element may include a connection portion.

The pawl protrudes from a downstream end of the lock portion in the direction of insertion toward the insertion portion. The pawl is engaged with the fixing device or the main housing.

The connection portion is configured to connect an upstream end of the insertion portion in the direction of insertion and the lock portion.

Since the lock portion which includes the pawl faces the insertion portion in the perpendicular direction, the insertion portion can be inserted between the opposing portion of the fixing device and the main housing, and the pawl of the lock portion can be engaged with the fixing device or the main housing, when attaching the restriction element.

The lock portion may include a first extension portion and the restriction element may include a second extension portion.

The first extension portion extends further upstream in the direction of insertion than the connection portion.

The second extension portion extends upstream from the connection portion in the direction of insertion. The second extension portion faces the first extension portion in the perpendicular direction.

Since the lock portion includes the first extension portion and the restriction element includes the second extension portion, by pinching and pulling the first extension portion and the second extension portion, the insertion portion can be pulled out from between the opposing portion and the main housing with the pawl of the lock portion disengaged from the fixing device or the main housing when removing the restriction element.

BRIEF DESCRIPTION OF DRAWINGS

The above aspects, other advantages and further features will become more apparent by describing in detail illustrative, non-limiting embodiments thereof with reference to the accompanying drawings, in which.

DESCRIPTION

Figure 1:
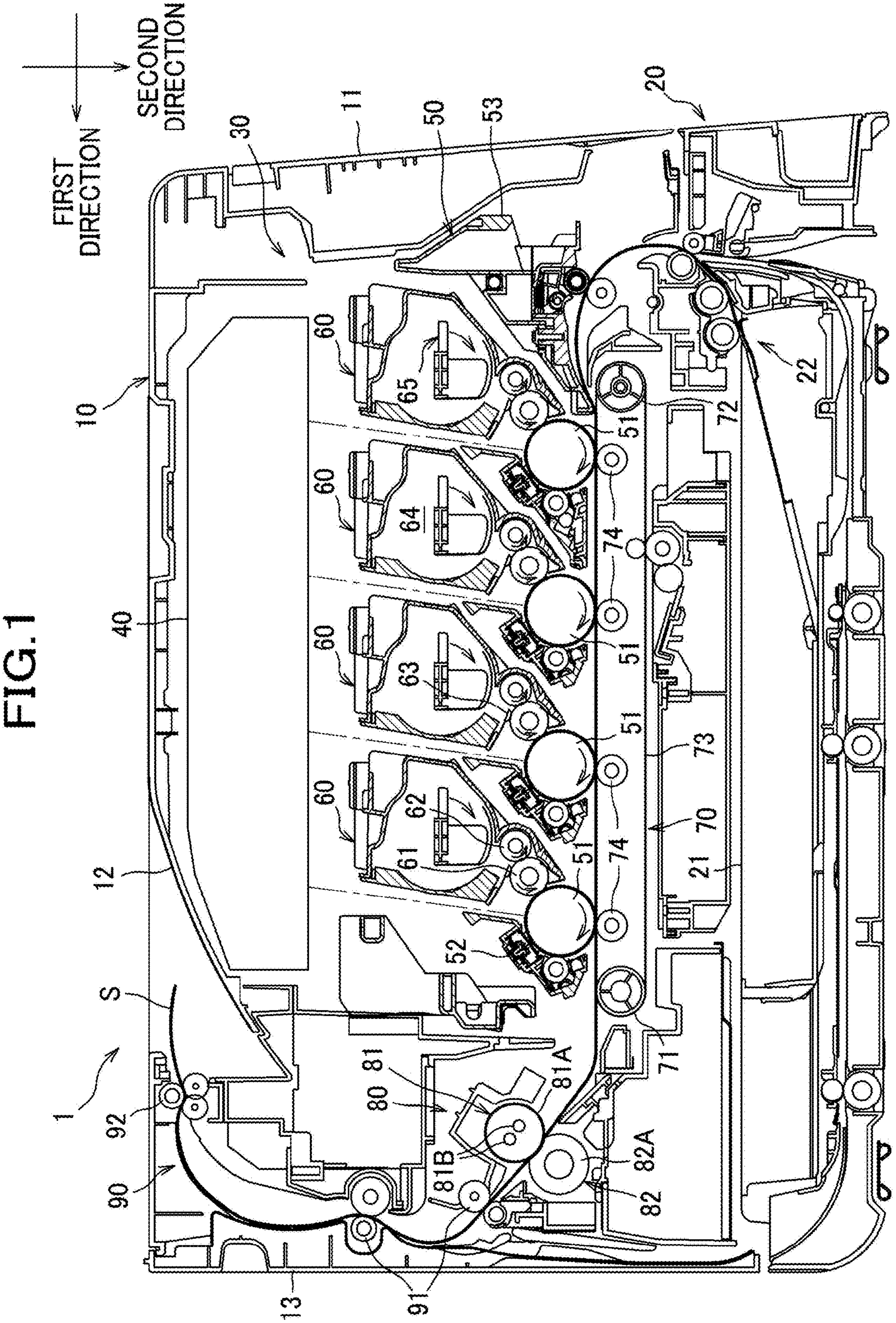
FIG. 1 is a cross-sectional view showing an image forming apparatus according to the present embodiment.

An embodiment of the present disclosure will be described in detail referring to the drawings where appropriate.

As shown in FIG. 1, an image forming apparatus 1 comprises a main housing 10, a front cover 11, a rear cover 13 as a cover, a sheet feeder unit 20, a process unit 30, a fixing device 80, and a sheet ejection unit 90.

The main housing 10 comprises an output tray 12 that supports sheets S on which images are formed. The front cover 11 covers and uncovers an opening formed on the front side of the main housing 10. The rear cover 13 covers and uncovers an opening formed on the rear side of the main housing 10.

The sheet feeder unit 20 comprises a sheet tray 21 and a feeding mechanism 22. The sheet tray 21 contains sheets S of paper or the like. The feeding mechanism 22 feeds the sheets S in the sheet tray 21 to the process unit 30.

The process unit 30 transfers a toner image onto each sheet S. The process unit 30 comprises an exposure device 40, a drum cartridge 50, a plurality of toner cartridges 60, and a transfer unit 70.

The exposure device 40 is located above the drum cartridge 50. The exposure device 40 emits light beams to expose surfaces of photosensitive drums 51.

The drum cartridge 50 is located between the sheet tray 21 and the exposure device 40. The drum cartridge 50 is installable into and removable from the main housing 10 through the opening of the main housing 10, which is uncovered by opening the front cover 11.

The drum cartridge 50 comprises a plurality of photosensitive drums 51, a plurality of chargers 52 corresponding to each of the photosensitive drums 51, and a drum frame 53.

The drum frame 53 supports the photosensitive drums 51 and the chargers 52. The photosensitive drums 51 are rotatable relative to the drum frame 53. The drum frame 53 is movably supported by the main housing 10. The toner cartridges 60 are installable onto and removable from the drum frame 53.

The plurality of toner cartridges 60 each contains toner of a different color. Each toner cartridge 60 comprises a development roller 61, a supply roller 62, a doctor blade 63, a toner containing unit 64 that contains toner, and an agitator 65.

The agitator 65 agitates toner in the toner containing unit 64. The agitator 65 supplies toner to the supply roller 62. The supply roller 62 supplies toner to the development roller 61. The doctor blade 63 adjusts the thickness of toner on the development roller 61 to a uniform thickness.

The transfer unit 70 is located between the sheet tray 21 and the drum cartridge 50. The transfer unit 70 comprises a drive roller 71, a follower roller 72, a conveyor belt 73, and a plurality of transfer rollers 74. The conveyor belt 73 is an endless belt for conveying the sheet S. The drive roller 71 and the follower roller 72 cause the conveyor belt 73 to rotate. The transfer rollers 74 face an inner surface of the conveyor belt 73. The conveyor belt 73 is sandwiched between the transfer rollers 74 and the photosensitive drums 51.

The fixing device 80 comprises a heating member 81 and a pressure member 82. The heating member 81 heats the sheet S. The heating member 81 comprises a heating roller 81A as an example of a rotatable heating body, and two heaters 81B. The pressure member 82 nips the sheet S in combination with the heating member 81. The pressure member 82 comprises a pressure roller 82A as an example of a rotatable pressure body.

The heating roller 81A and the pressure roller 82A are rotatable. In this embodiment, the heating roller 81A receives a driving force from a drive source and rotates. The pressure roller 82A is driven by the heating roller 81 and rotates.

The chargers 52 charge the respective surfaces of the photosensitive drums 51. The exposure device 40 exposes the surfaces of the photosensitive drums 51. Electrostatic latent images are thereby formed on the photosensitive drums 51. The development rollers 61 supply toner to the respective photosensitive drums 51. Toner images are thereby formed on the photosensitive drums 51.

The sheet feeder unit 20 feeds the sheet S through between the photosensitive drums 51 and the transfer rollers 74. The toner images on the photosensitive drums 51 are transferred onto the sheet S. The sheet S on which the toner images are transferred is conveyed through between the heating roller 81A and the pressure roller 82A. The fixing device 80 thereby fixes the toner images on the sheet S.

The sheet ejection unit 90 comprises conveyor rollers 91 and an ejection roller 92. The conveyor rollers 91 convey the sheet S to the ejection roller 92. The ejection roller 92 ejects the sheet S onto the output tray 12.

Figure 2:
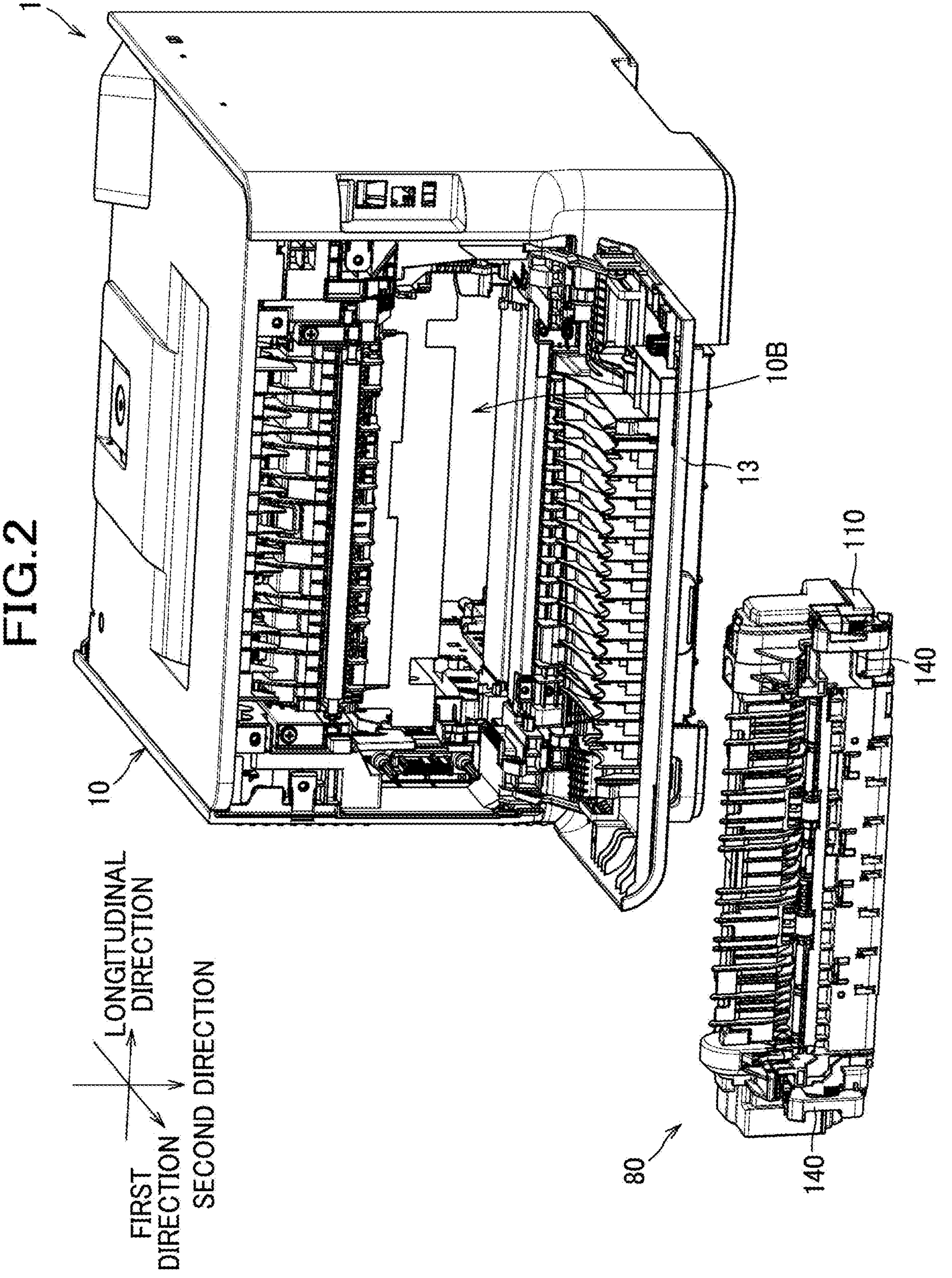
FIG. 2 is a schematic view showing a main housing with a rear cover open, and a fixing device.

As shown in FIG. 2, the fixing device 80 is installable into and removable from the main housing 10. In the following description, directions will be described using longitudinal direction, first direction, and second direction shown in FIG. 2. The arrows showing the longitudinal direction, the first direction, and the second direction in the drawings point to one side in each direction.

The longitudinal direction is the longitudinal direction of the fixing device 80. The longitudinal direction is also the longitudinal direction of the heating member 81 and the pressure member 82. In more detail, the longitudinal direction is the longitudinal of the heating roller 81A and the pressure roller 82A. In the present embodiment, the longitudinal direction corresponds to a lateral direction of the image forming apparatus 1. One side in the longitudinal direction corresponds to the left side of the image forming apparatus 1, and the other side in the longitudinal direction corresponds to the right side of the image forming apparatus 1.

The first direction is a direction perpendicular to the longitudinal direction. In this embodiment, the first direction corresponds to the front-rear direction of the image forming apparatus. One side in the first direction corresponds to the rear side of the image forming apparatus 1, and the other side in the first direction corresponds to the front side of the image forming apparatus 1.

The second direction is a direction perpendicular to the longitudinal direction and to the first direction. In this embodiment, the second direction corresponds to the up-down direction of the image forming apparatus 1. One side in the second direction corresponds to the downward side of the image forming apparatus 1, and the other side in the second direction corresponds to the upward side of the image forming apparatus 1.

The main housing 10 has an opening 10B at an end thereof on the one side in the first direction, and the rear cover 13 is rotated to cover and uncover the opening 10B. When the rear cover 13 is open, the fixing device 80 is exposed and removable from the main housing 10. The fixing device 80 is installable into and removable from the main housing 10 through the opening 10B which is uncovered by opening the rear cover 13.

Specifically, the fixing device 80 is installable into the main housing 10 from the one side to the other side in the first direction and removable from the main housing 10 from the other side to the one side in the first direction. The fixing device 80 is installable into and removable from the main housing 10 through the opening 10B.

Figure 3:
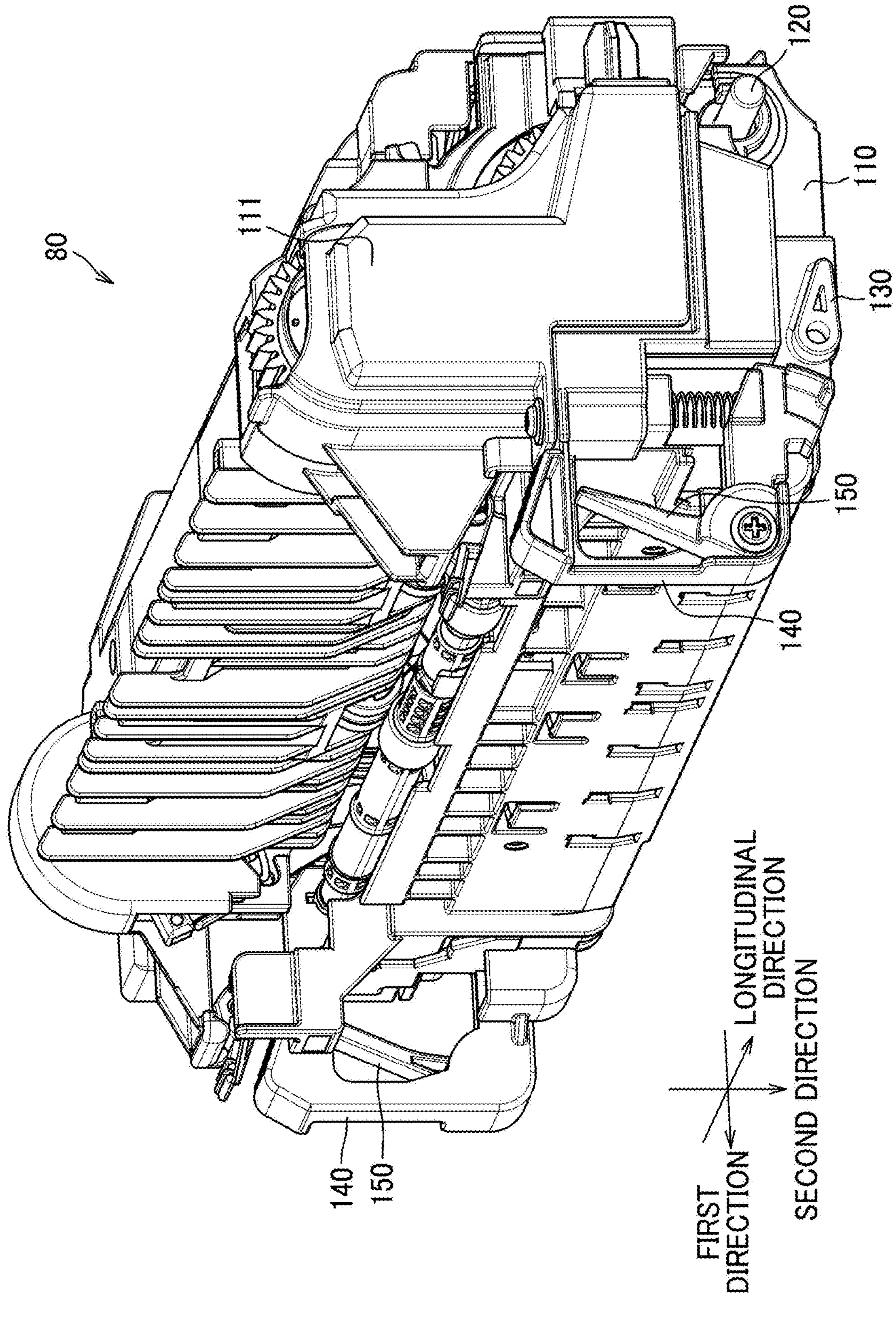
FIG. 3 is a schematic view of the fixing device.

As shown in FIG. 3, the fixing device 80 comprises a fixing housing 110. The fixing housing 110 supports the heating member 81 and the pressure member 82. The fixing housing 110 supports the heating roller 81A and the pressure roller 82A in a manner that allows the heating roller 81A and the pressure roller 82A to rotate. The fixing device 80 comprises a positioning boss 120 and a pivot boss 130 on the one side and the other side in the longitudinal direction.

In this embodiment, the bosses 120, 130 on the one side in the longitudinal direction and structures therearound and the bosses 120, 130 on the other side in the longitudinal direction and structures therearound are approximately symmetrical in the longitudinal direction. The bosses 120, 130 on the one side in the longitudinal direction and structures therearound will be referred to and described in the following description.

The positioning boss 120 is a part that contacts the main housing 10 and is thereby located in place relative to the main housing 10 in the first direction and the second direction in a state where the fixing device 80 is installed in the main housing 10. The positioning boss 120 extends in the longitudinal direction. Specifically, the positioning boss 120 protrudes in the longitudinal direction. In more detail, the positioning boss 120 protrudes longitudinally outward from a side surface of the fixing housing 110 facing in the longitudinal direction. The positioning boss 120 has a cylindrical shape.

The pivot boss 130 is a part that contacts the main housing 10 to prevent rotation of the fixing device 80 about the positioning boss 120 in a state where the fixing device 80 is installed in the main housing 10. The pivot boss 130 extends in the longitudinal direction. Specifically, the pivot boss 130 protrudes in the longitudinal direction. In more detail, the pivot boss 130 protrudes longitudinally outward from a side surface of the fixing housing 110 facing in the longitudinal direction.

Figure 4:
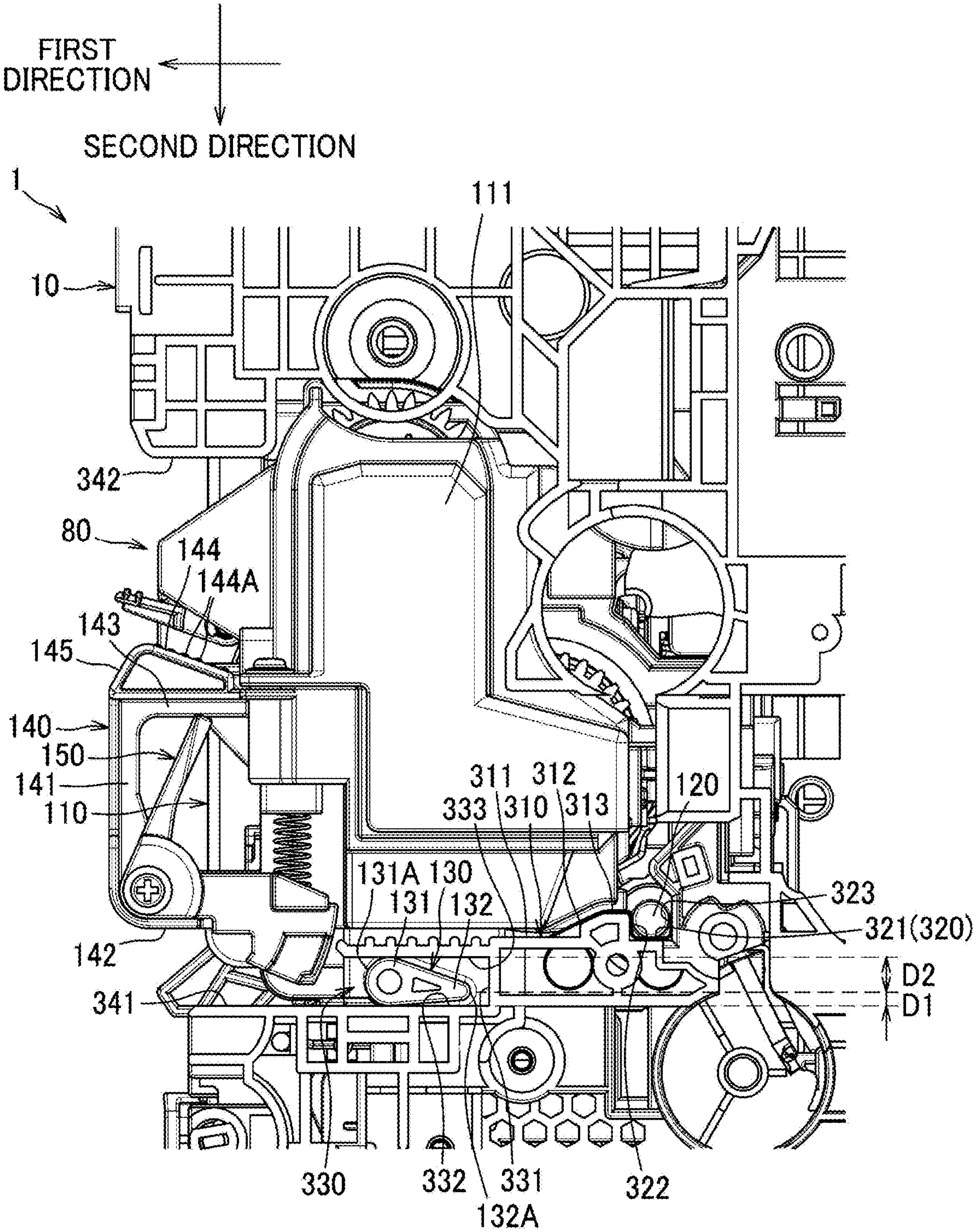
FIG. 4 is an illustration showing the main housing and the fixing device located in a first position.

As shown in FIG. 4, the pivot boss 130 is located further to the one side in the first direction than the positioning boss 120 in a state where the fixing device 80 is installed in the main housing 10. In other words, the positioning boss 120 is located further to the other side in the first direction than the pivot boss 130 in a state where the fixing device 80 is installed in the main housing 10.

Further, the positioning boss 120 is located in a position different from a position of the pivot boss 130 in the second direction in a state where the fixing device 80 is installed in the main housing 10. Specifically, the positioning boss 120 is located further to the other side in the second direction than the pivot boss 130 in a state where the fixing device 80 is installed in the main housing 10.

The pivot boss 130 has a shape that is elongated in the first direction. In this embodiment, the pivot boss 130 includes a shaft portion 131 and a tapered portion 132.

The shaft portion 131 is an end of the pivot boss 130 on the one side in the first direction. The shaft portion 131 has an arc-shaped cylindrical surface 131A as viewed in the longitudinal direction. The cylindrical surface 131A is contactable with an inner surface of a groove 330 formed in the main housing 10.

The tapered portion 132 is an end of the of the pivot boss 130 on the other side in the first direction. The tapered portion 132 extends from the shaft portion 131 toward the other side in the first direction. The tapered portion 132 has a tapered shape with a dimension in the second direction that decreases as the tapered portion 132 extends from the one side to the other side in the first direction. The tapered portion 132 has a leading edge 132A. The leading edge 132A is an edge of the pivot boss 130 on the other side in the first direction.

The main housing 10 has a guide surface 310, a recess 320, a groove 330, a first restriction surface 341, and a second restriction surface 342.

The recess 320 is recessed toward the one side in the second direction. The positioning boss 120 of the fixing device 80 is located in the recess 320 in a state where the fixing device 80 is installed in the main housing 10. The recess 320 is located further to the other side in the first direction than the groove 330.

The recess 320 has a first reference surface 321, a second reference surface 322, and a stopping surface 323.

The first reference surface 321 is a surface of the recess 320 facing the other side in the second direction. The first reference surface 321 is perpendicular to the second direction.

The second reference surface 322 is a surface of the recess 320 facing the other side in the first direction. The second reference surface 322 extends from an edge of the first reference surface 321 on the one side in the first direction toward the other side in the second direction. The second reference surface 322 is perpendicular to the first direction.

The stopping surface 323 is a surface of the recess facing the one side in the first direction. The stopping surface 323 extends from an edge of the first reference surface 321 on the other side in the first direction toward the other side in the second direction. The stopping surface 323 is perpendicular to the first direction. The stopping surface 323 restrains the fixing device 80 from moving further to the other side in the first direction in a state where the positioning boss 120 of the fixing device 80 is in contact with the stopping surface 323.

The guide surface 310 guides the positioning boss 120 toward the recess 320 when the fixing device 80 is being installed into the main housing 10. The guide surface 310 includes a first guide surface 311, a second guide surface 312, and a third guide surface 313.

The first guide surface 311 extends in the first direction.

The second guide surface 312 is located between the first guide surface 311 and the recess 320. Specifically, the second guide surface 312 is located between the first guide surface 311 and the third guide surface 313. The second guide surface 312 is inclined diagonally upward such that an edge of the second guide surface 312 on the one side in the first direction is located further to the one side in the second direction than an edge of the second guide surface 312 on the other side in the first direction.

The third guide surface 313 is located between the second guide surface 312 and the recess 320. The third guide surface 313 extends from an edge of the second guide surface 312 on the other side in the first direction toward the other side in the first direction. The edge of the third guide surface 313 on the other side in the first direction is connected to the edge of the second reference surface 322 on the other side in the second direction.

The groove 330 extends in the first direction. The groove 330 opens toward the one side in the first direction. The pivot boss 130 of the fixing device 80 is located in the groove 330 in a state where the fixing device 80 is installed in the main housing 10. The pivot boss 130 enters the groove 330 in the process of the fixing device 80 being installed into the main housing 10. The groove 330 has a bottom surface 331, a first surface 332, and a second surface 333.

The bottom surface 331 is a surface of the groove 330 facing the one side in the first direction.

The first surface 332 and the second surface 333 are surfaces for stopping the fixing device 80 from rotating about the positioning boss 120. The first surface 332 and the second surface 333 extend in the first direction.

The first surface 332 is a surface of the groove 330 facing the other side in the second direction. The first surface 332 extends from an edge of the bottom surface 331 on the one side in the second direction toward the one side in the first direction.

The second surface 333 is a surface of the groove 330 facing the one side in the second direction. The second surface 333 is located further to the other side in the second direction than the first surface 332. The second surface 333 extends from an edge of the bottom surface 331 on the other side in the second direction toward the one side in the first direction. The first surface 332 and the second surface 333 face each other in the second direction.

The pivot boss 130 of the fixing device 80 is located between the first surface 332 and the second surface 333 in a state where the fixing device 80 is installed in the main housing 10. The leading edge 132A of the pivot boss 130 is located closer to the first surface 332 than to the second surface 333 in a state where the fixing device 80 is installed in the main housing 10. Specifically, a distance D1 from the first surface 332 to the leading edge 132A in the second direction is shorter than a distance D2 from the second surface 333 to the leading edge 132A in the second direction in a state where the fixing device 80 is installed in the main housing 10.

The first restriction surface 341 contacts the fixing device 80 from the one side in the second direction to restrain the fixing device 80 from moving toward the one side in the second direction when the fixing device 80 is being installed into the main housing 10. The first restriction surface 341 extends in the first direction. Specifically, the first restriction surface 341 extends from an edge of the first surface 332 of the groove 330 on the one side in the first direction toward the one side in the first direction. In this embodiment, the first restriction surface 341 is flush with the first surface 332. When the fixing device 80 is being installed into the main housing 10, the pivot boss 130 contacts the first restriction surface 341.

The second restriction surface 342 contacts the fixing device 80 from the other side in the second direction to restrain the fixing device 80 from moving toward the other side in the second direction when the fixing device 80 is being installed into the main housing 10. The second restriction surface 342 extends in the first direction. The second restriction surface 342 faces the first restriction surface 341 as viewed in the longitudinal direction. The fixing housing 110 comprises protrusions 111 that respectively protrude longitudinally outward from one side and the other side thereof in the longitudinal direction (see also FIG. 3). When the fixing device 80 is being installed into the main housing 10, an end of the protrusion 111 on the other side in the second direction contacts the second restriction surface 342.

The fixing device 80 further comprises a handle 140 and a lock lever 150 at an end of the fixing device 80 on the one side in the first direction. The handle 140 and the lock lever 150 are provided on one side and the other side of the fixing device 80 in the longitudinal direction (see FIG. 3).

In this embodiment, the handle 140 and the lock lever 150 on the one side in the longitudinal direction and the handle 140 and the lock lever 150 on the other side in the longitudinal direction have structures approximately symmetrical in the longitudinal direction. The handle 140 and the lock lever 150 on the one side in the longitudinal direction will be referred to and described in the following description.

The handle 140 is graspable when the fixing device is installed into and removed from the main housing 10. The handle 140 is fixed to the fixing housing 110. In this embodiment, the handle 140 is integral with the fixing housing 110.

The fixing device 80 is rotatable relative to the main housing 10 about the pivot boss 130, with the pivot boss 130 located in the groove 330, in such a manner that the positioning boss 120 moves in the second direction. Specifically, the fixing device 80 is rotatable relative to the main housing 10 about the shaft portion 131 of the pivot boss 130.

Figure 5:
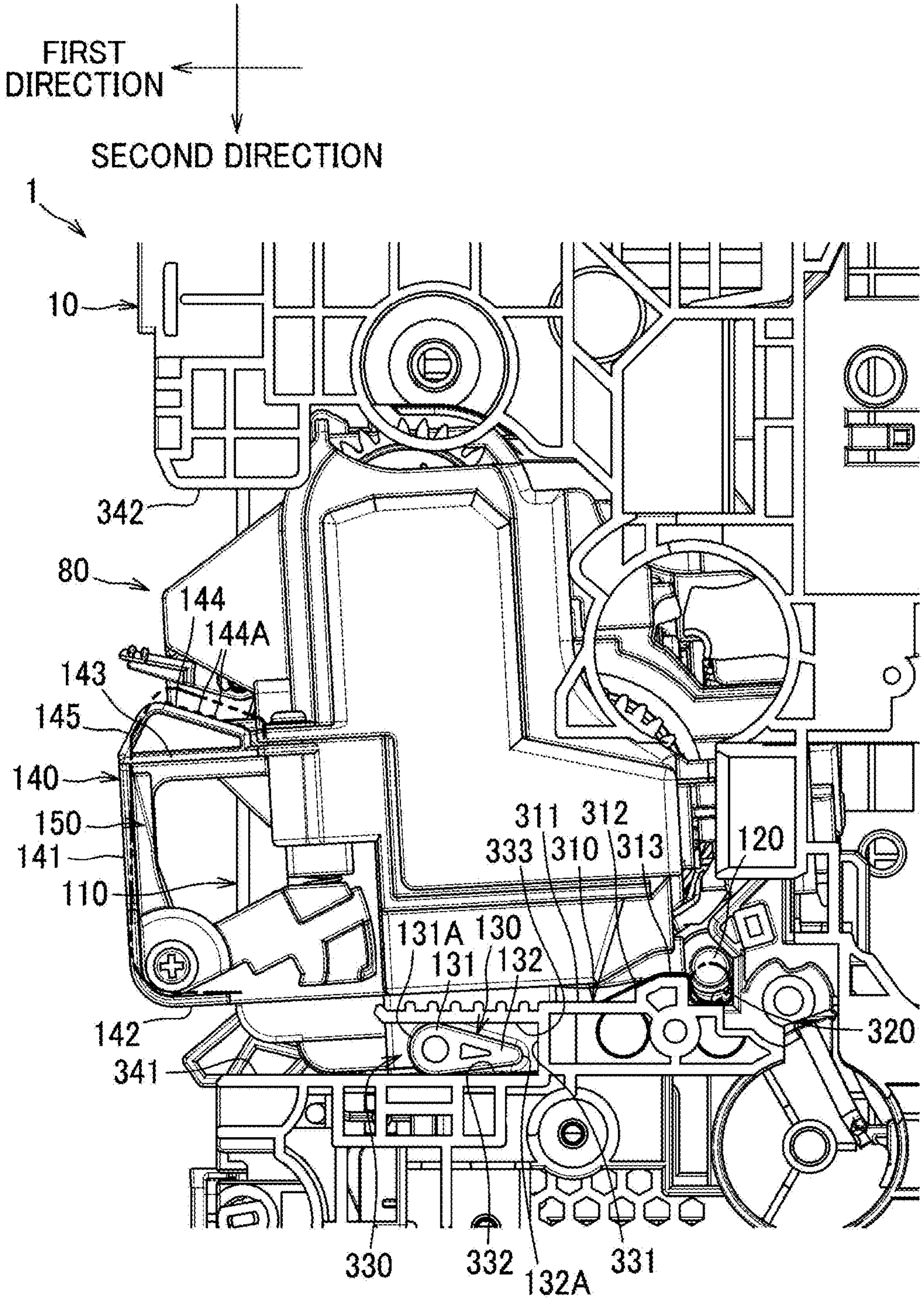
FIG. 5 is an illustration showing the main housing and the fixing device located in a second position.

Further, the fixing device 80 is rotatable relative to the main housing 10 from a first position shown in FIG. 4 to a second position shown in FIG. 5 by moving a grip 141 of the handle 140 toward the one side in the second direction in a state where the fixing device 80 is installed in the main housing 10.

The first position shown in FIG. 4 is a position of the fixing device 80 installed in the main housing 10. The positioning boss 120 is located in the recess 320 in a state where the fixing device 80 is located in the first position. The fixing device 80 in the first position is restrained from moving from the other side to the one side in the first direction in a state where the positioning boss 120 is in contact with the second reference surface 322 of the recess 320. The fixing device 80 in the first position is restrained from moving from the one side to the other side in the first direction in a state where the positioning boss 120 is in contact with the stopping surface 323 of the recess 320.

The second position shown in FIG. 5 is a position different from the first position. Specifically, the second position is a position of the fixing device 80 rotated from the first position in such a manner that the positioning boss 120 rotates toward the other side in the second direction. In this embodiment, more than half of the positioning boss 120 moves out of the recess 320 when the fixing device 80 is rotated from the first position to the second position. The fixing device 80 becomes movable in the first direction relative to the main housing 10 after the fixing device 80 is rotated from the first position to the second position.

Figure 6A:
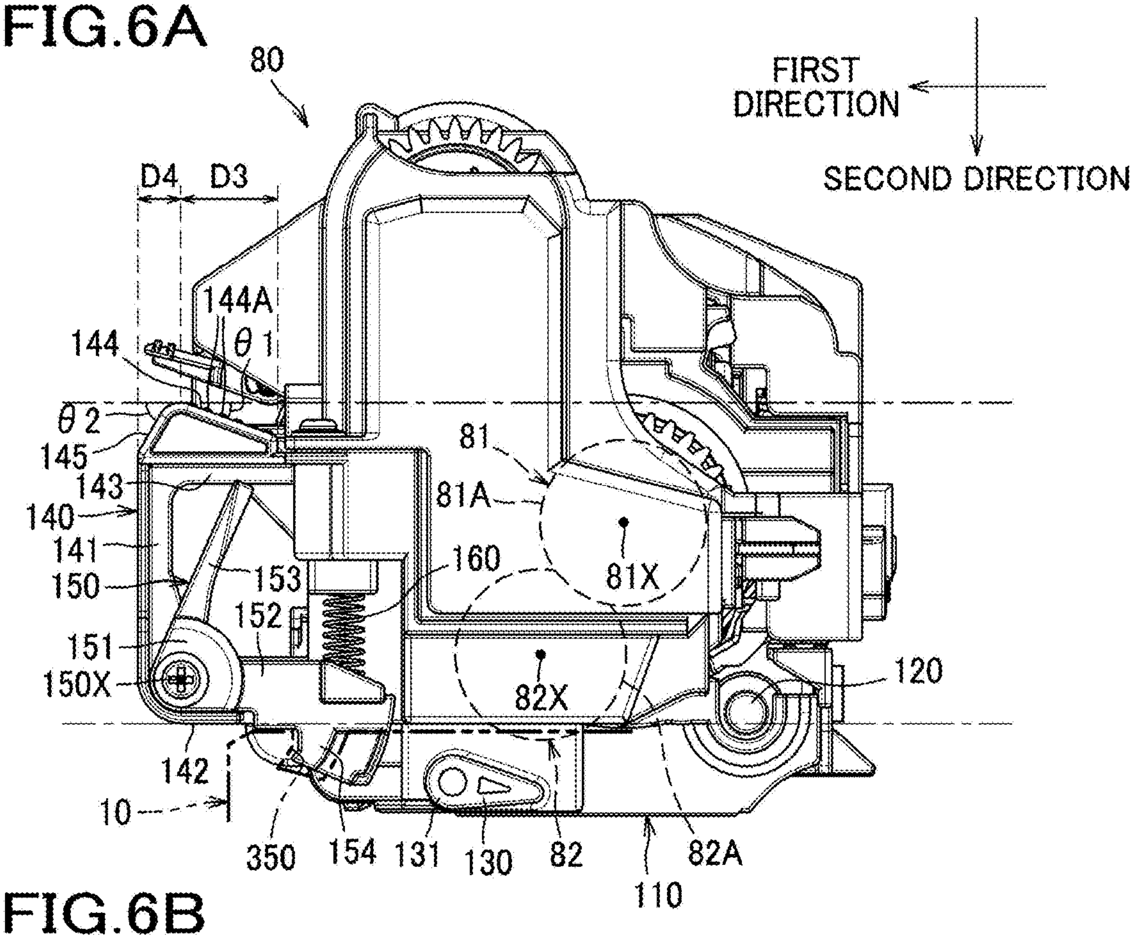
FIG. 6A and FIG. 6B are side views of the fixing device.

As shown in FIG. 6A, the handle 140 includes a grip 141, a first connection portion 142, and a second connection portion 143.

The grip 141 is an end of the handle 140 on the one side in the first direction, which is graspable by a user. The grip 141 is spaced apart from the fixing housing 110 in the first direction by a predetermined distance. The grip 141 extends in the second direction in a state where the fixing device 80 is located in the first position.

The first connection portion 142 is an end of the handle 140 on the one side in the second direction. The first connection portion 142 extends in the first direction and connects an end of the grip 141 on the one side in the second direction to the fixing housing 110.

The second connection portion 143 is an end of the handle 140 on the other side in the second direction. The second connection portion 143 extends in the first direction and connects an end of the grip 141 on the other side in the second direction and the fixing housing 110.

The handle 140 includes a first inclined surface 144 and a second inclined surface 145 on the second connection portion 143.

The first inclined surface 144 and the second inclined surface 145 are located on a side of the second connection portion 143 facing the other side in the second direction.

The first inclined surface 144 is inclined diagonally downward such that an edge of the first inclined surface 144 on the one side in the first direction is located further to the other side in the second direction than an edge of the first inclined surface 144 on the other side in the first direction in a state where the fixing device 80 is located in the first position. The first inclined surface 144 is also inclined diagonally downward such that an edge of the first inclined surface 144 on the one side in the first direction is located further to the other side in the second direction than an edge of the first inclined surface 144 on the other side in the first direction in a state where the fixing device 80 is located in the second position (see FIG. 5).

A plurality of protrusions 144A are provided on the first inclined surface 144. Each of the protrusions 144A extends in the longitudinal direction. These protrusions 144A can restrain the user's fingers from sliding off the first inclined surface 144 when the fixing device is being installed into and removed from the main housing 10. The protrusions 144A can provide an anti-slip function.

The second inclined surface 145 is located further to the one side in the first direction than the first inclined surface 144. The second inclined surface 145 is inclined diagonally upward such that an edge of the second inclined surface 145 on the one side in the first direction is located further to the one side in the second direction than an edge of the second inclined surface 145 on the other side in the first direction in a state where the fixing device 80 is located in the first position. The second inclined surface 145 is also inclined diagonally upward such that an edge of the second inclined surface 145 on the one side in the first direction is located further to the one side in the second direction than an edge of the second inclined surface 145 on the other side in the first direction in a state where the fixing device 80 is located in the second position (see FIG. 5).

A dimension D3 of the first inclined surface 144 in the first direction is larger than a dimension D4 of the second inclined surface 145 in the first direction in a state where the fixing device 80 is located in the first position. An inclination angle θ1 of the first inclined surface 144 relative to the first direction is smaller than an inclination angle θ2 of the second inclined surface 145 relative to the first direction, as viewed in the longitudinal direction, in a state where the fixing device 80 is located in the first position.

A central portion of the heating member 81 in the second direction and a central portion of the pressure member 82 in the second direction are located between one end and the other end of the handle 140 in the second direction. In more detail, a rotation axis 81X of the heating roller 81A and a rotation axis 82X of the pressure roller 82A are located between the one end and the other end of the handle 140 in the second direction. The rotation axes 81X, 82X extend in the longitudinal direction. The entire heating roller 81A is located between the one end and the other end of the handle 140 in the second direction.

The lock lever 150 is a member that restricts the fixing device from moving in the first direction relative to the main housing 10 in a state where the fixing device 80 is located in the first position. The lock lever 150 is provided on the handle 140. Specifically, the lock lever 150 is attached to the handle 140. The lock lever 150 includes an attachment portion 151, an arm 152, a lever grip 153, and an engagement portion 154.

The attachment portion 151 is attached to the handle 140. The attachment portion 151 is attached to an end of the first connection portion 142 of the handle 140 on the one side in the first direction. The attachment portion 151 is rotatable relative to the handle 140 about a lever axis 150X.

The arm 152 extends from the attachment portion 151 toward the other side in the first direction.

The lever grip 153 is graspable by a user. The lever grip 153 extends from the attachment portion 151 toward the other side in the second direction. Specifically, the lever grip 153 extends diagonally from the attachment portion 151 toward an end of the second connection portion 143 of the handle 140 on the other side in the first direction in a state where the lock lever 150 is located in a lock position shown in FIG. 6A.

The engagement portion 154 protrudes from the arm 152 toward the one side in the second direction. The main housing 10 has an engagement hole 350. The engagement portion 154 is engageable with the engagement hole 350.

Figure 6B:
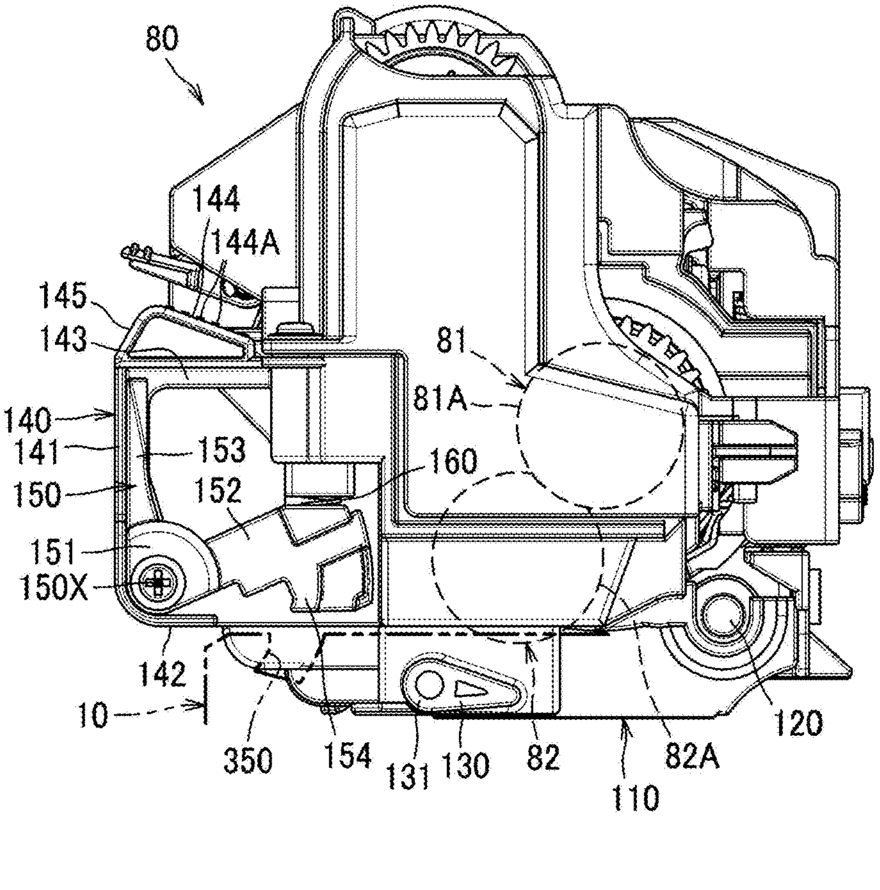

The lock lever 150 is movable between the lock position shown in FIG. 6A and an unlock position shown in FIG. 6B in a state where the fixing device 80 is located in the first position. Specifically, the lock lever 150 is rotatable between the lock position and the unlock position about the lever axis 150X.

When the lock lever 150 is located in the lock position, the engagement portion 154 is engaged with the engagement hole 350 of the main housing 10 and restrains the fixing device 80 from moving in the first direction relative to the main housing 10. When the lock lever 150 is located in the unlock position, the engagement portion 154 is not engaged with the engagement hole 350.

The lock lever 150 is biased by a spring 160 to rotate from the unlock position to the lock position. When a user grasps the grip 141 of the handle 140 and the lever grip 153 and moves the lever grip 153 toward the grip 141, the lock lever 150 rotates from the lock position to the unlock position. When the lock lever 150 rotates from the lock position to the unlock position with the fixing device 80 located in the first position, the engagement portion 154 moves out of the engagement hole 350. The fixing device 80 thereby becomes rotatable relative to the main housing 10.

Next, the action of installing the fixing device 80 into the main housing 10 will be described.

Figure 7A:
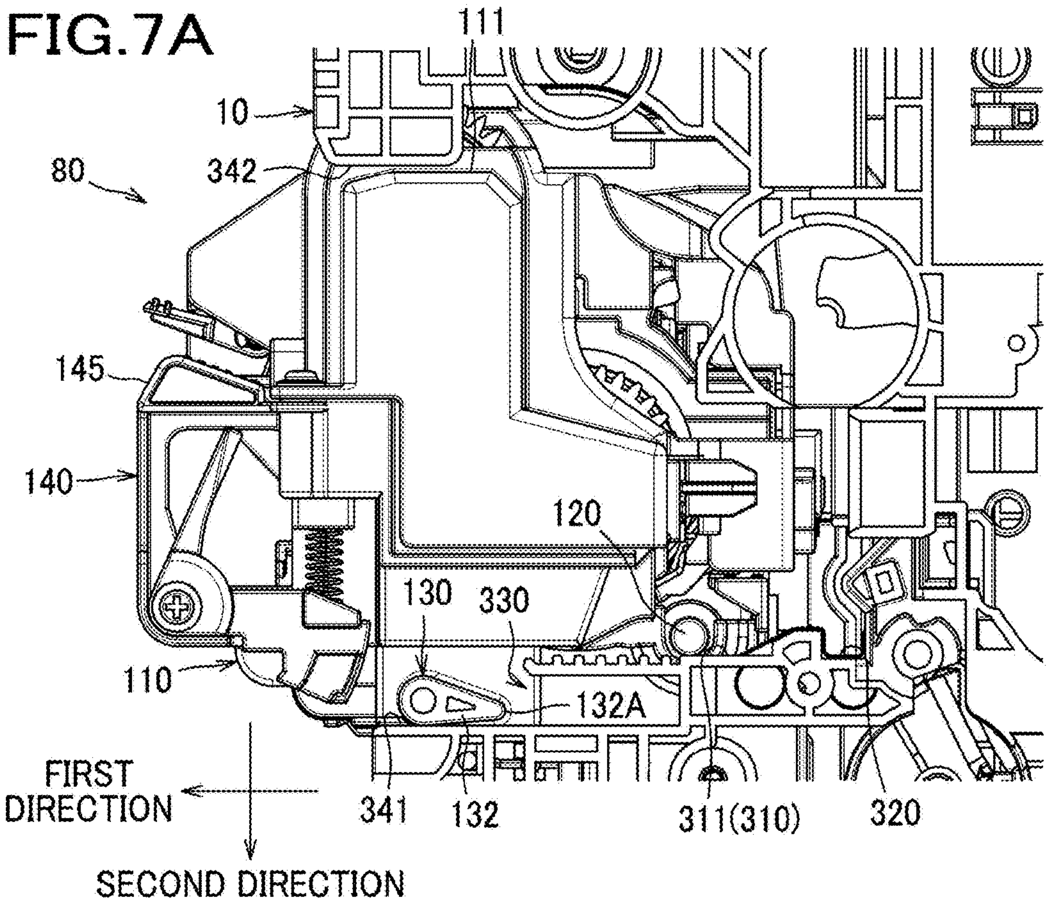
FIG. 7A and FIG. 7B are illustrations showing actions in the process of installing the fixing device into the main housing.

As shown in FIG. 7A, as the fixing device 80 is inserted into the main housing 10 from the one side to the other side in the first direction, the protrusion 111 of the fixing housing 110 contacts the second restriction surface 342 and the pivot boss 130 contacts the first restriction surface 341. The fixing device 80 is thereby held between the first restriction surface 341 and the second restriction surface 342, which restrains the fixing device 80 from moving in the second direction.

Figure 7B:
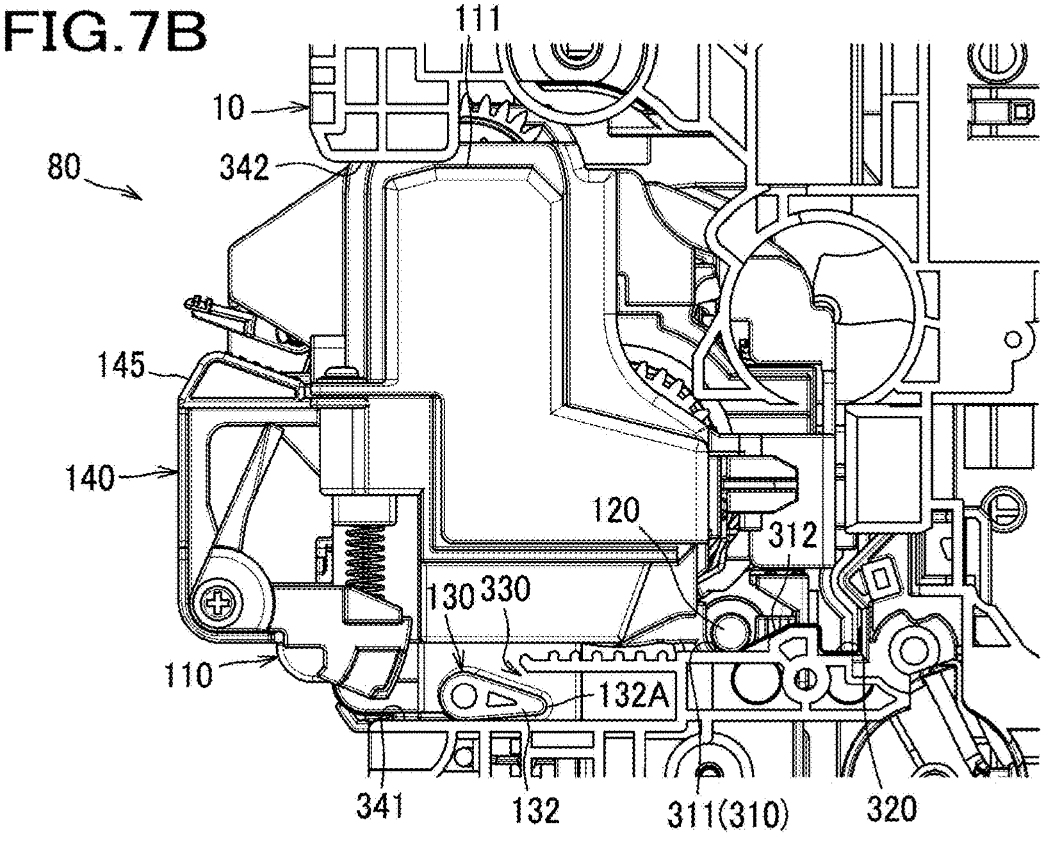

Subsequently, the positioning boss 120 contacts the first guide surface 311 of the guide surface 310 and is guided by the first guide surface 311 as shown in FIGS. 7A and 7B. The fixing device 80 moves along the first direction in the process of the positioning boss 120 being guided by the first guide surface 311.

A portion of the pivot boss 130, specifically, the leading edge 132A of the tapered portion 132 enters the groove 330 in the process of the positioning boss 120 being guided by the first guide surface 311. Since the tapered portion 132 has a tapered shape that narrows toward the other side in the first direction, the pivot boss smoothly enters the groove without being caught at an inlet of the groove 330.

As shown in FIG. 7B, the pivot boss 130, i.e., the leading edge 132A of the tapered portion 132, is located in the groove 330 at the point where the positioning boss 120 is guided to the end of the first guide surface 311 on the other side in the first direction.

Figure 8A:
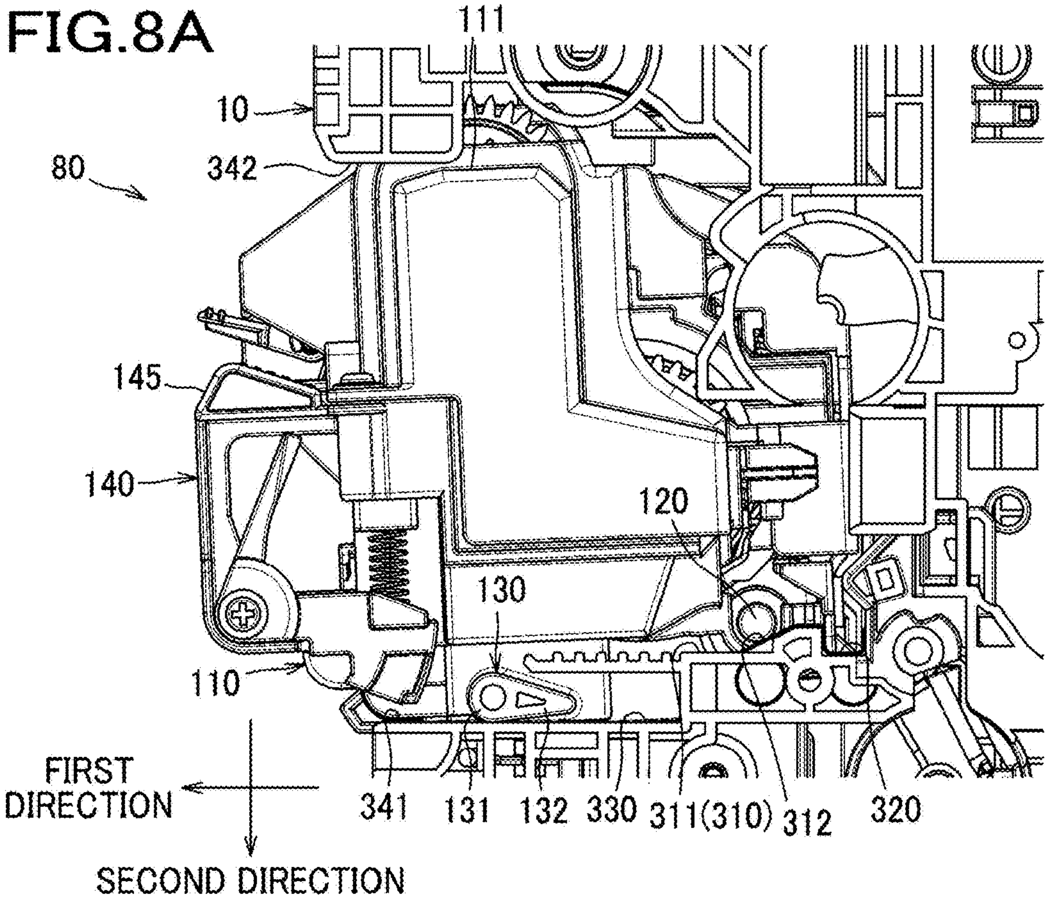
FIG. 8A and FIG. 8B are illustrations showing actions following those shown in FIG. 7A and FIG. 7B in the process of installing the fixing device into the main housing.

As the fixing device 80 is inserted further into the main housing 10, the positioning boss 120 contacts the second guide surface 312 and is guided from the first guide surface 311 to the second guide surface 312 as shown in FIG. 8A. As the positioning boss 120 is guided by the second guide surface 312, the positioning boss 120 moves diagonally upward such that the positioning boss 120 is located further to the other side in the second direction as the positioning boss 120 moves toward the other side in the first direction.

This causes the fixing device 80 to rotate about the shaft portion 131 of the pivot boss 130 in the counter-clockwise direction of FIG. 8A in such a manner that the positioning boss 120 moves toward the other side in the second direction in the process of the positioning boss 120 being guided from the first guide surface 311 to the second guide surface 312. The fixing device 80 is thereby inserted into the main housing 10 with a surface of the fixing device 80 on the other side in the first direction facing diagonally upward.

Figure 8B:
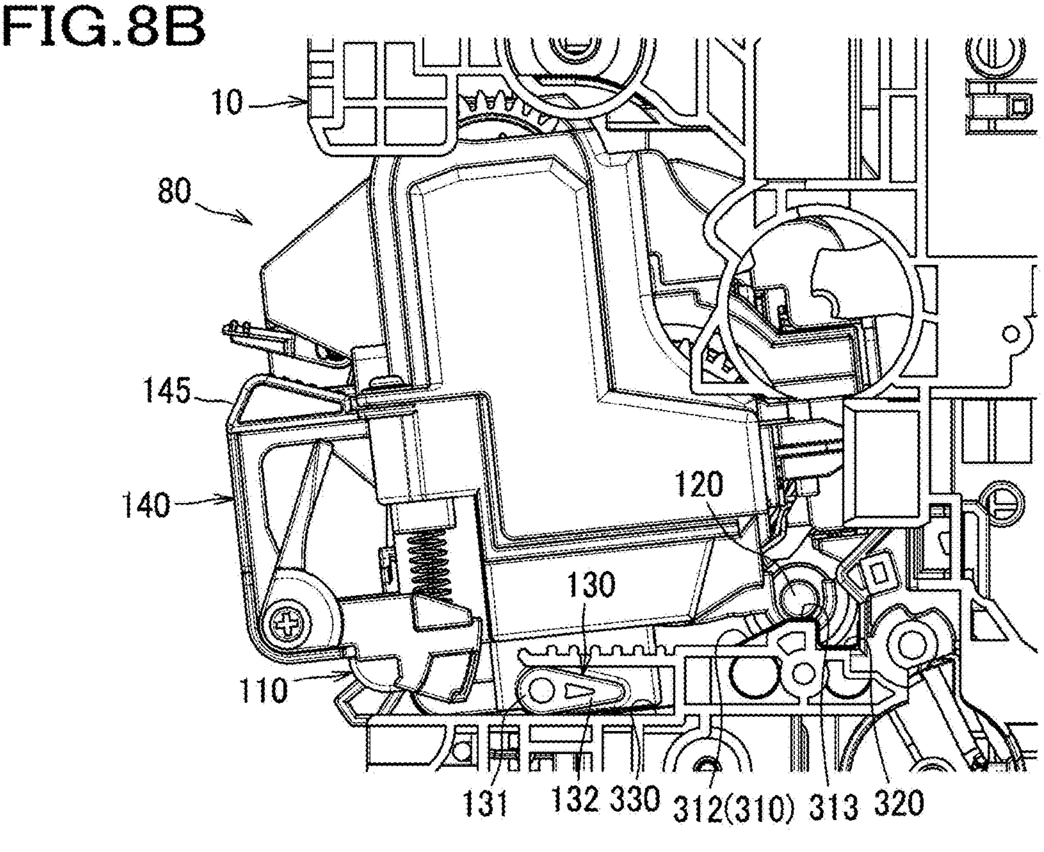

Thereafter, as shown in FIG. 8B, the positioning boss 120 contacts the third guide surface 313 and is guided thereby. The fixing device 80 moves along the first direction again in the process of the positioning boss 120 being guided by the third guide surface 313.

When the positioning boss 120 is disengaged from the third guide surface 313 as shown in FIG. 4, the positioning boss 120 enters the recess 320. In the process of the positioning boss 120 entering the recess 320, the fixing device 80 rotates in the clockwise direction of FIG. 4 about the shaft portion 131 of the pivot boss 130 in such a manner that the positioning boss 120 moves to the one side in the second direction. The positioning boss 120 enters the recess 320 as the fixing device 80 rotates relative to the main housing 10.

If a user grasps the handle 140 and pushes the second inclined surface 145 when the fixing device 80 is being inserted into the main housing 10, the positioning boss 120 receives a force against the guide surface 310 and a force from the one side to the other side in the first direction. The fixing device 80 can thereby be easily installed into the main housing 10.

Next, the action of removing the fixing device 80 from the main housing 10 will be described.

In the process of removing the fixing device 80 from the main housing 10, the grip 141 of the handle 140 and the lever grip 153 of the lock lever 150 are grasped in the state shown in FIG. 6A. The lock lever 150 is thereby rotated from the lock position to the unlock position shown in FIG. 6B.

Subsequently, as the handle 140 is pushed down toward the one side in the second direction, the fixing device 80 rotates in the counter-clockwise direction of FIG. 6B about the shaft portion 131 of the pivot boss 130. Specifically, the fixing device 80 rotates from the first position to the second position shown in FIG. 5.

The positioning boss 120 thereby moves from a position in the recess 320 to the other side in the second direction such that more than half of the positioning boss 120 moves out of the recess 320. At this point, a force applied to the first inclined surface 144 exerts a force on the handle 140 toward the one side in the second direction. Thus, it is easier to push down the handle 140 toward the one side in the second direction.

Thereafter, as a user pulls the handle 140 to the one side in the first direction, the positioning boss 120 is disengaged from the recess 320, and the fixing device 80 moves from the other side to the one side in the first direction and is removed from the main housing 10. At this point, a force applied to the first inclined surface 144 exerts a force on the handle 140 toward the one side in the first direction. Thus, it is easier to pull the handle 140 from the other side to the one side in the first direction.

Figure 9:
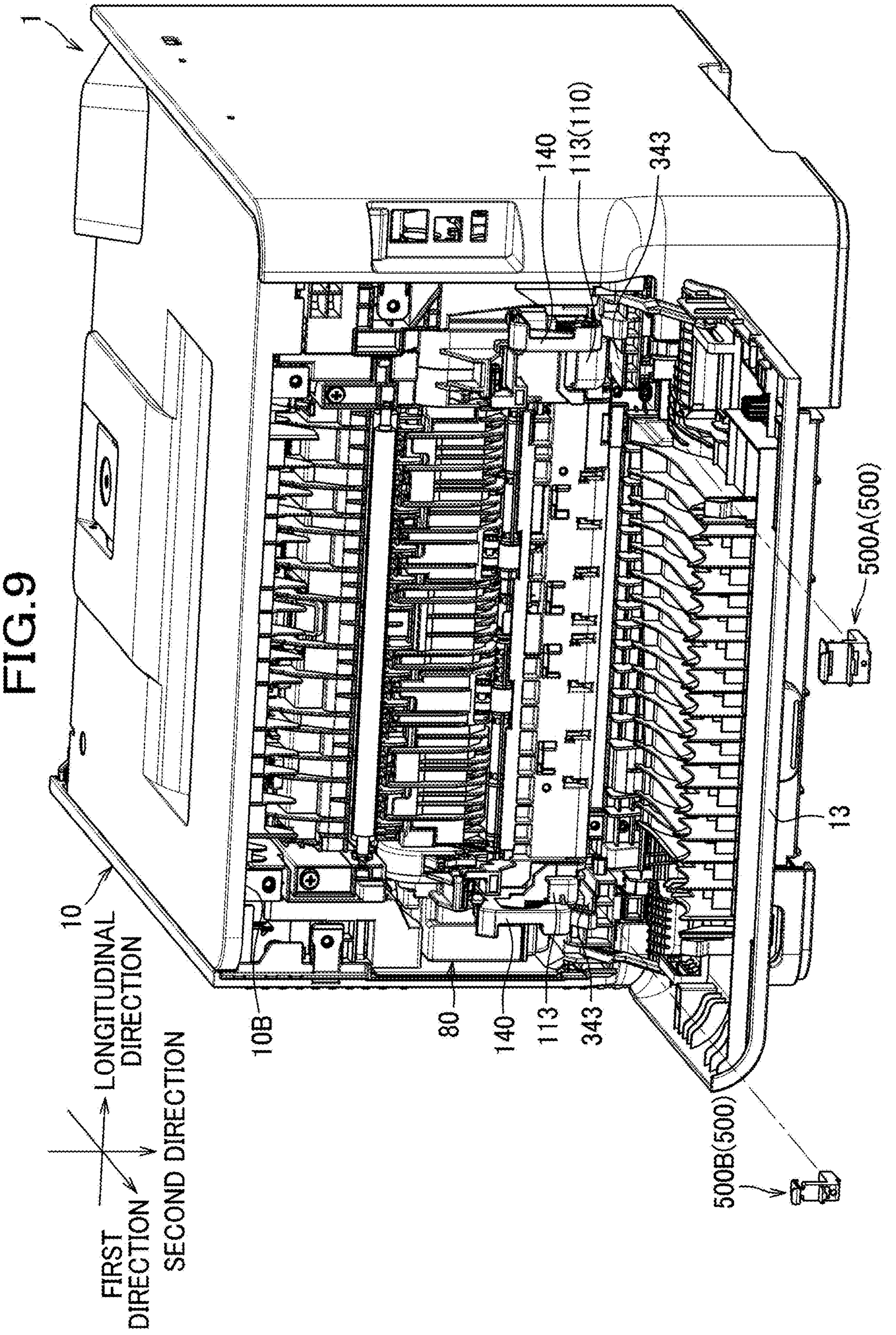
FIG. 9 is a schematic view showing the main housing with the rear cover open, the fixing device installed in the main housing, and a spacer.

As shown in FIG. 9, the image forming apparatus 1 further comprises a spacer 500 as a restriction member. The spacer 500 is attachable to and removable from the main housing 10 in a state where the fixing device 80 is installed in the main housing 10. The spacer 500 is for transportation use and is attached to the main housing 10, for example, when the image forming apparatus 1 is transported with the fixing device 80 installed in the main housing 10. The spacer 500 is removed when the image forming apparatus 1 is to be used.

The spacer 500 is a different color than the main housing 10 and the fixing housing 110 so that it is noticeable that the spacer 500 is attached to the main housing 10. In this embodiment, the spacer 500 is made of colored plastic that is a different color than the main housing 10 and the fixing housing 110. As one example, the spacer 500 is made of orange colored polypropylene (PP).

Figure 10A:
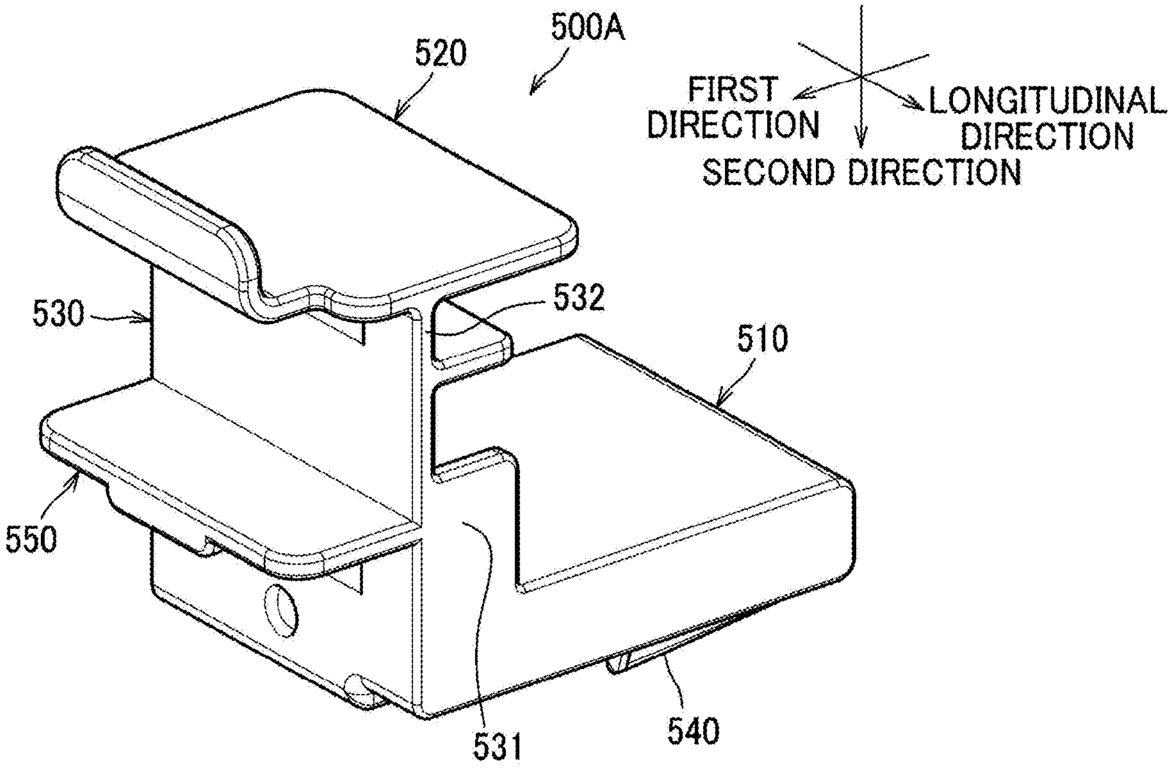
FIG. 10A and FIG. 10B are schematic views of a first spacer.
Figure 11A:
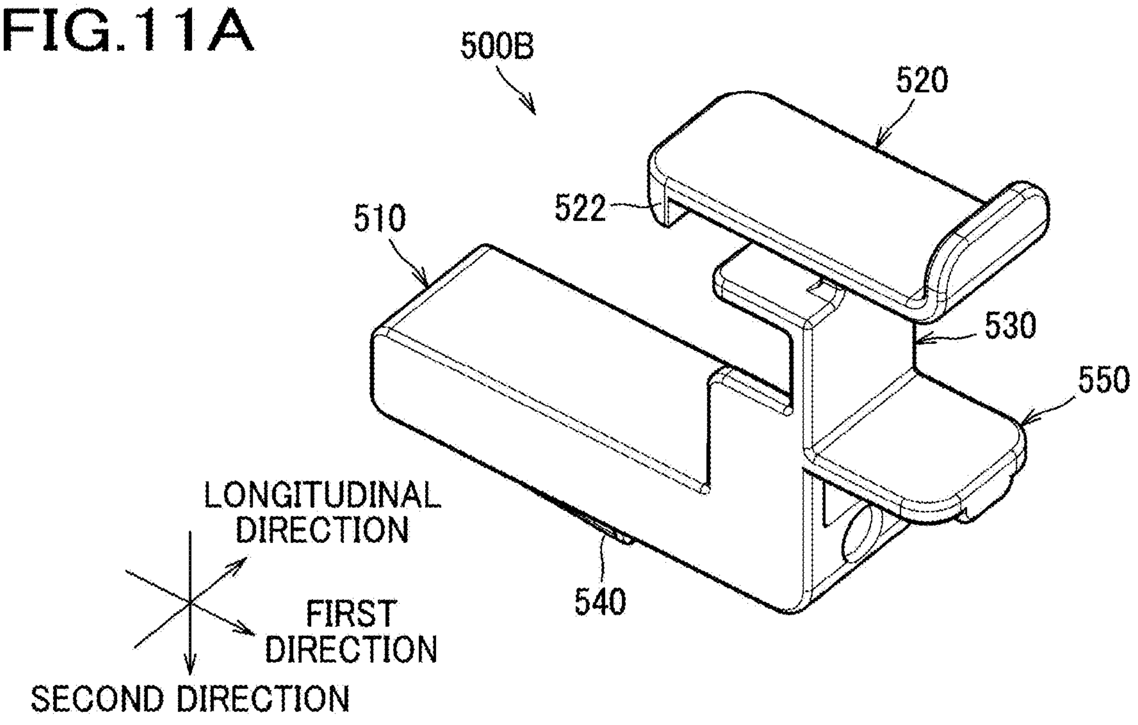
FIG. 11A and FIG. 11B are schematic views of a second spacer.

The spacer 500 comprises a first spacer 500A and a second spacer 500B. The first spacer 500A is attachable to an end portion of the main housing 10 on the one side in the longitudinal direction and removable therefrom. The second spacer 500B is attachable to an end portion of the main housing 10 on the other side in the longitudinal direction and removable therefrom. As shown in FIGS. 10A and 11A, the first spacer 500A and the second spacer 500B each comprise an insertion portion 510, a lock portion 520, and a connection portion 530.

Although the first spacer 500A and the second spacer 500B have different longitudinal dimensions, they have approximately the same structures. In the following description, the first spacer 500A will be referred to and described as the spacer 500. Further, portions of the main housing 10 and the fixing device 80 to which the first spacer 500A is attached and portions of the main housing 10 and the fixing device 80 to which the second spacer 500B is attached have approximately the same structures. In the following description, the structures of the portions of the main housing 10 and the fixing device 80 to which the first spacer 500A is attached will be described as the portions of the main housing 10 and the fixing device 80 to which the spacer 500 is attached.

Figure 12A:
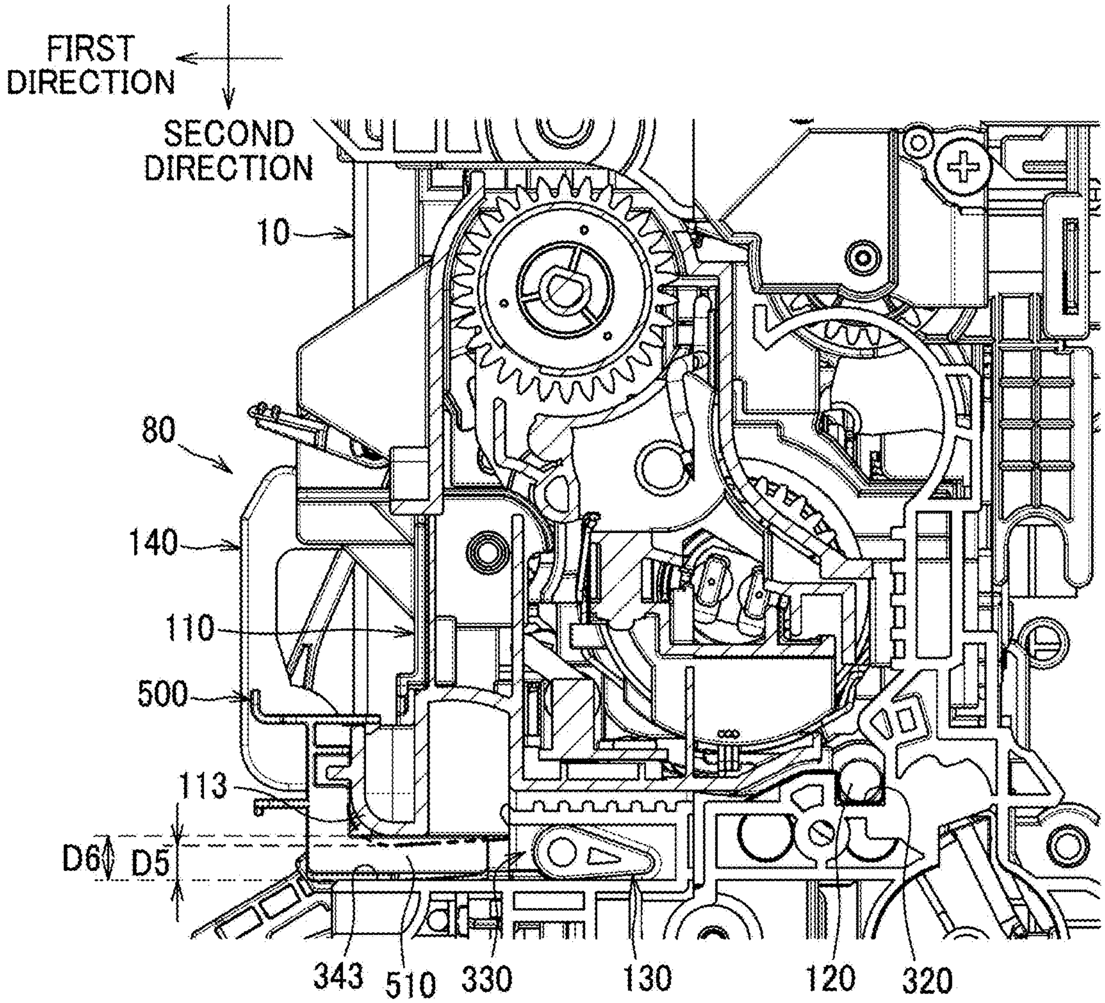
FIG. 12A is an illustration showing the fixing device and the spacer installed in the main housing.

As shown in FIG. 12A, the main housing 10 includes a main-housing-side opposing portion 343 at an end of the main housing 10 on the one side in the first direction. The main-housing-side opposing portion 343 is located inward of the first restriction surface 341 (see FIG. 4) in the longitudinal direction.

The end of the fixing device 80 on the one side in the first direction includes an opposing portion 113. Specifically, the fixing housing 110 includes the opposing portion 113 at an end thereof on the one side in the first direction. The opposing portion 113 faces the main-housing-side opposing portion 343 in the second direction in a state where the fixing device 80 is installed in the main housing 10. The opposing portion 113 is located on an inner side of the handle 140 in the longitudinal direction. The opposing portion 113 is opposed to the main-housing-side opposing portion 343 of the main housing 10 in a state where the fixing device 80 is installed in the main housing 10.

The opposing portion 113 moves closer to the main-housing-side opposing portion 343 when the fixing device 80 is rotated about the pivot boss 130 in the counter-clockwise direction of FIG. 12A from a state where the fixing device 80 is installed in the main housing 10 in such a manner that the positioning boss 120 moves to the other side in the second direction. Specifically, the opposing portion 113 moves closer to the main-housing-side opposing portion 343 when the fixing device 80 rotates from the first position to the second position shown by a dashed-double dotted line.

A distance D5 from the main-housing-side opposing portion 343 to the opposing portion 113 of the fixing device 80 located in the second position is shorter than a distance D6 from the main-housing-side opposing portion 343 to the opposing portion 113 of the fixing device 80 located in the first position.

Figure 12B:
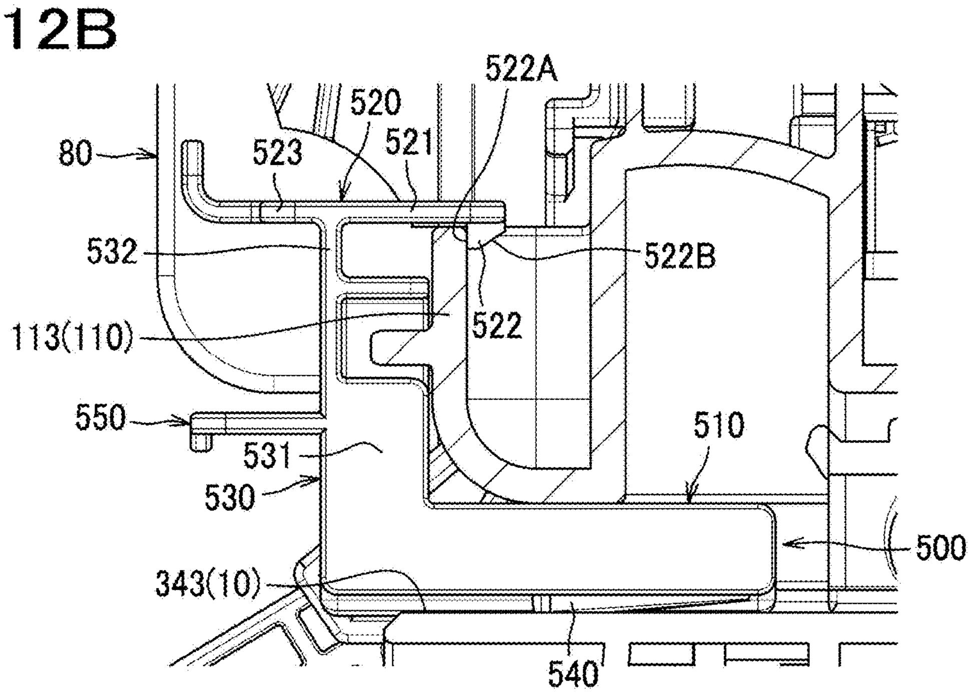
FIG. 12B is an enlarged view of the spacer and its surroundings.

As shown in FIG. 12B, the insertion portion 510 of the spacer 500 is a portion that is inserted between the opposing portion 113 and the main-housing-side opposing portion 343 and extends in the first direction. The insertion portion 510 is inserted and held between the opposing portion 113 and the main-housing-side opposing portion 343. The spacer 500 with its insertion portion 510 inserted between the opposing portion 113 and the main-housing-side opposing portion 343 is located further to the one side in the first direction than the pivot boss 130 (see FIG. 12A).

Since the spacer 500, i.e., the insertion portion 510 which is a portion of the spacer 500, is held between the opposing portion 113 of the fixing device 80 and the main-housing-side opposing portion 343 of the main housing 10, the spacer 500 restrains the fixing device 80 from moving relative to the main housing 10 toward the other side in the second direction. Specifically, the spacer 500 restrains rotation of the fixing device 80 from the first position to the second position.

The spacer 500 is attached to the main housing 10 from the one side to the other side in the first direction. Specifically, the insertion portion 510 is inserted between the opposing portion 113 and the main-housing-side opposing portion 343 from the one side to the other side in the first direction. In this embodiment, the first direction corresponds to "direction of insertion of the insertion portion". The one side in the first direction corresponds to "upstream" in the direction of insertion, and the other side in the first direction corresponds to "downstream" in the direction of insertion.

The spacer 500 further includes ribs 540. The ribs 540 are portions of the insertion portion 510 that protrude from the insertion portion 510 and contact the main housing 10. Specifically, the ribs 540 protrude from a surface of the insertion portion 510 facing the one side in the second direction toward the one side in the second direction. The ribs 540 contact the main-housing-side opposing portion 343 in a state where the insertion portion 510 is inserted between the opposing portion 113 and the main-housing-side opposing portion 343.

The ribs 540 extend in the first direction. An amount of protrusion of each rib 540 decreases as each rib 540 extends from the one side to the other side in the first direction. In more detail, the amount of protrusion of each rib 540 toward the one side in the second direction decreases from the one side to the other side in the first direction. In other words, a dimension of each rib in the second direction decreases from the one side to the other side in the first direction.

Figure 10B:
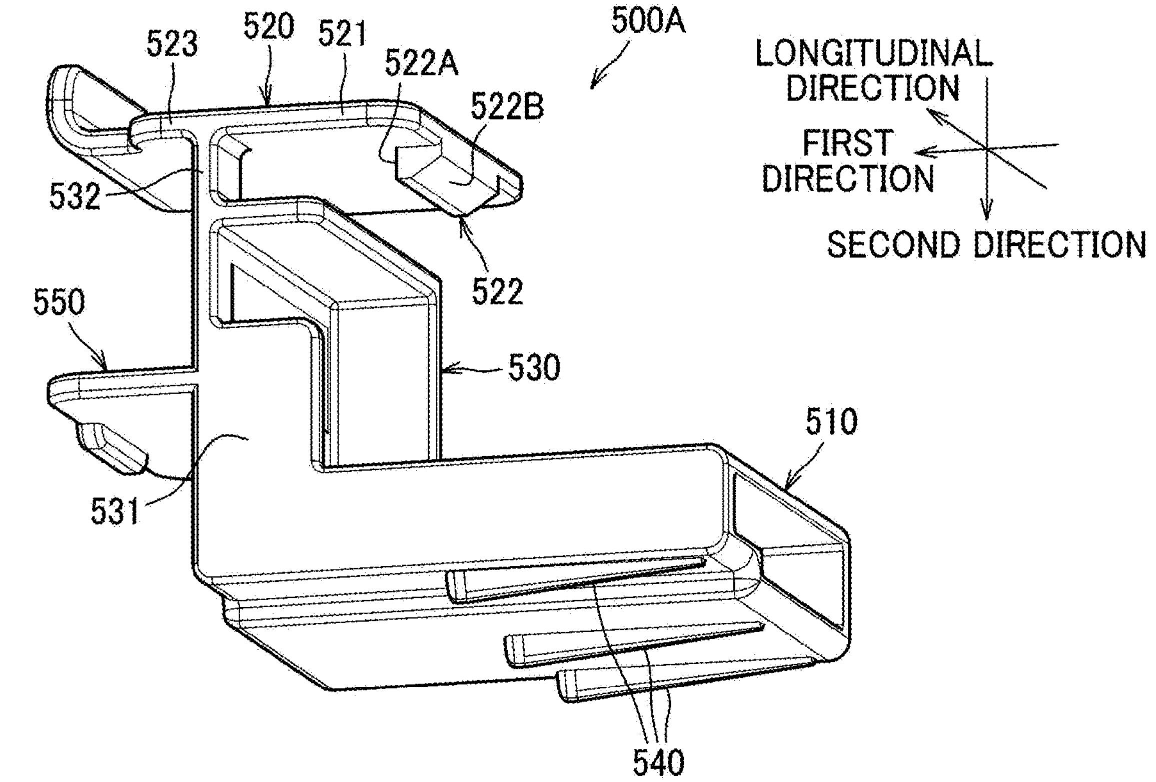
Figure 11B:
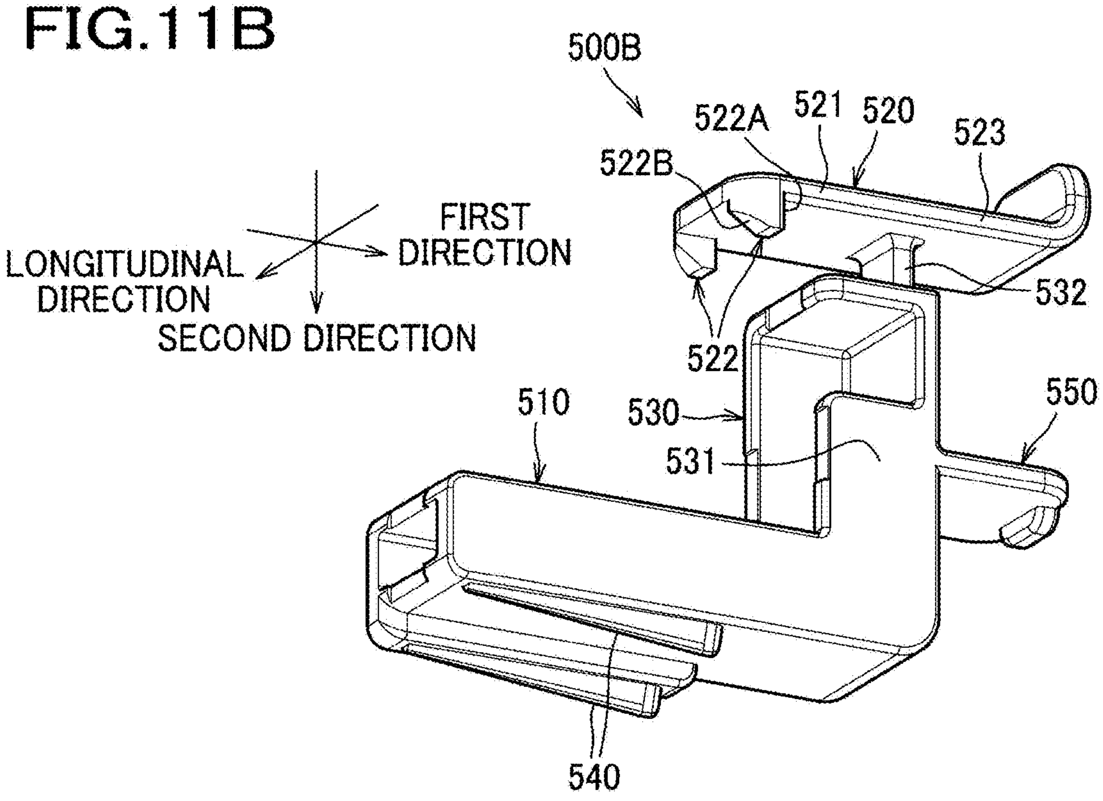

The ribs 540 are disposed side-by-side in the longitudinal direction. Specifically, as shown in FIG. 10B, three ribs 540 are disposed side-by-side on the first spacer 500A. Further, as shown in FIG. 11B, two ribs 540 are disposed side-by-side on the second spacer 500B.

As shown in FIG. 12B, the lock portion 520 is a portion that is engaged with the fixing device 80 to restrain the insertion portion 510 from falling out from between the opposing portion 113 and the main-housing-side opposing portion 343 and extends in the first direction. The lock portion 520 faces the insertion portion 510 in the second direction. In this embodiment, the second direction corresponds to "perpendicular direction that is perpendicular to the direction of insertion".

The lock portion 520 includes a lock portion body 521, a pawl 522, and a first extension portion 523. The lock portion body 521 extends from the connection portion 530 toward the other side in the first direction. The lock portion body 521 faces the insertion portion 510 in the second direction.

The pawl 522 is a portion that is engaged with the fixing device 80 in a state where the spacer 500 is attached to the main housing 10. The pawl 522 protrudes from an end of the lock portion body 521 on the other side in the first direction toward the insertion portion 510 and toward the one side in the second direction. The pawl 522 has an engagement surface 522A and an inclined surface 522B.

The engagement surface 522A is contactable with the fixing device 80 in a state where the spacer 500 is attached to the main housing 10 and is approximately perpendicular to the first direction. The inclined surface 522B extends from an edge of the engagement surface 522A on the one side in the second direction toward the other side in the first direction. The inclined surface 522B is inclined such that an edge of the inclined surface 522B on the one side in the second direction is located further to the one side in the first direction than an edge of the inclined surface 522B on the other side in the second direction.

The number and longitudinal dimension of the pawl 522 provided on the first spacer 500A are different from those of the pawl 522 provided on the second spacer 500B. Specifically, as shown in FIG. 10B, the first spacer 500A includes one pawl 522 extending in the longitudinal direction. As shown in FIG. 11B, the second spacer 500B includes two pawls 522 disposed side-by-side in the longitudinal direction. A longitudinal dimension of the pawl 522 of the second spacer 500B is smaller than that of the pawl 522 of the first spacer 500A.

As shown in FIG. 12B, the first extension portion 523 extends from the connection portion 530 toward the one side in the first direction. In other words, the first extension portion 523 is a portion of the lock portion 520 that extends further to the one side in the first direction than the connection portion 530. An end of the first extension portion 523 on the one side in the first direction is bent and extends toward the other side in the second direction.

The connection portion 530 connects an end of the insertion portion 510 on the one side in the first direction and the lock portion 520 and extends in the second direction. The connection portion 530 includes a body portion 531 and a first end portion 532. The first end portion 532 is an end of the connection portion 530 on the other side in the second direction. A dimension of the first end portion 532 in the first direction is smaller than a dimension of the body portion 531 in the first direction.

The spacer 500 further includes a second extension portion 550. The second extension portion 550 extends from the connection portion 530 toward the one side in the first direction. Specifically, the connection portion 530 has a central portion in the second direction and the second extension portion 550 extends from a vicinity of the central portion toward the one side in the first direction. The second extension portion 550 faces the first extension portion 523 of the lock portion 520 in the second direction. An end of the second extension portion 550 on the one side in the first direction has a portion that protrudes toward the one side in the second direction.

In the process of attaching the spacer 500 to the main housing 10, the spacer 500 is inserted into the main housing 10 from the one side to the other side in the first direction, so that the insertion portion 510 is forced in between the main-housing-side opposing portion 343 of the main housing 10 and the opposing portion 113 of the fixing device 80. At this point, the lock portion body 521 of the lock portion 520 is deflected to the other side in the second direction as the inclined surface 522B of the pawl 522 contacts an end of the opposing portion 113 on the other side in the second direction.

After the spacer 500 is inserted and the inclined surface 522B passes the end of the opposing portion 113 on the other side in the second direction, the deflection of the lock portion body 521 is restored and the pawl 522 is engaged with the opposing portion 113. With the spacer 500 attached, the fixing device 80 is restrained from rotating from the first position to the second position.

In the process of removing the spacer 500 from the main housing 10, the spacer is pulled from the other side to the one side in the first direction. At this point, the lock portion 520 pivots in the counter-clockwise direction of FIG. 12A about the vicinity of the first end portion 532 of the connection portion 530 in response to the first extension portion 523 and the second extension portion 550 being pinched by one's fingers, and the pawl 522 moves from the one side to the other side in the second direction and is disengaged from the opposing portion 133. Thereafter, the insertion portion 510 is pulled out from between the main-housing-side opposing portion 343 and the opposing portion 113.

Figure 13:
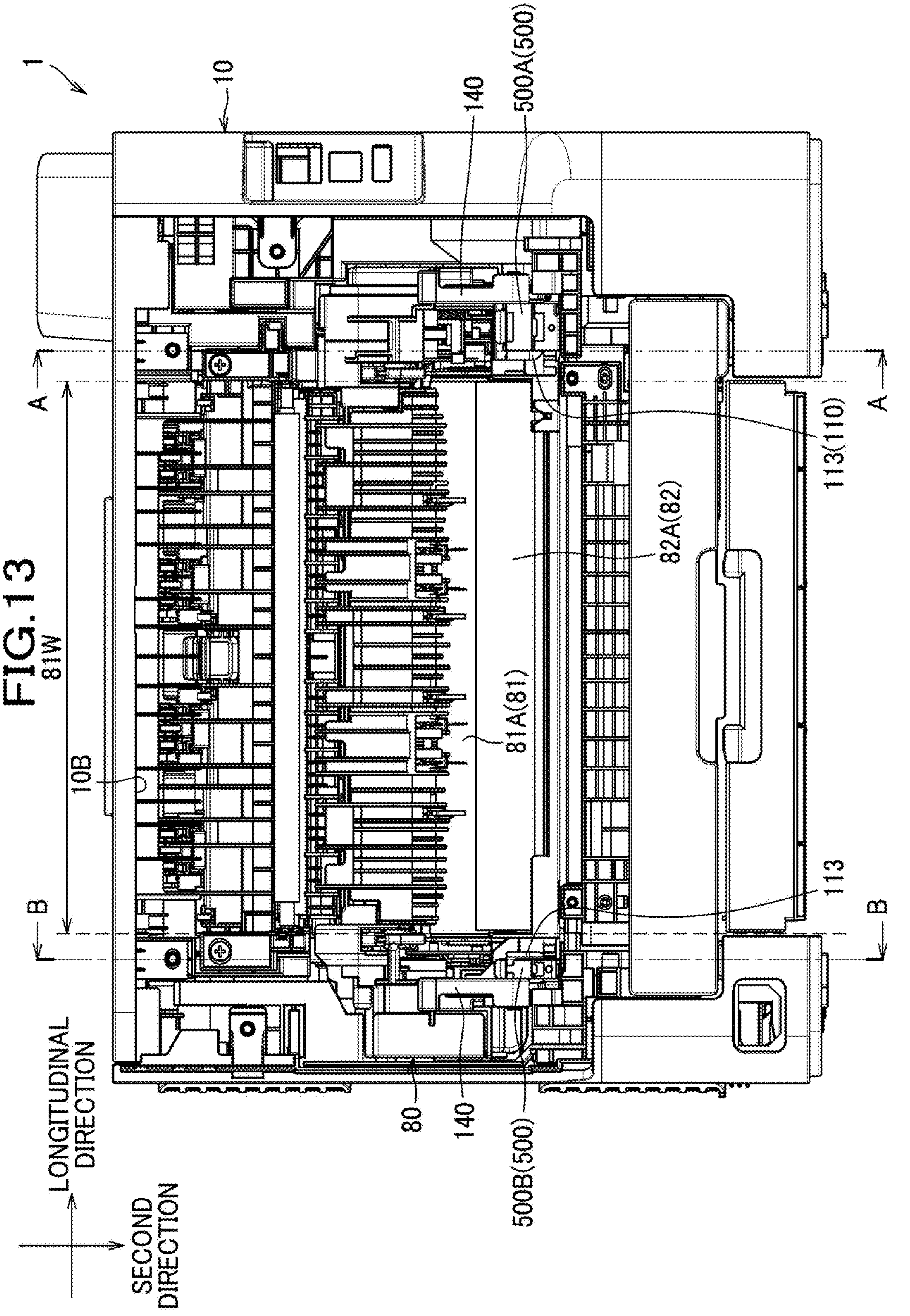
FIG. 13 is a rear view showing the main housing, the fixing device installed in the main housing, and the spacer.

As shown in FIG. 13, the spacer 500 attached to the main housing 10 is located further outward than the heating member 81 in the longitudinal direction. In this embodiment, the spacer 500 is located further outward than a longitudinal extent 81W of the heating roller 81A. Specifically, the first spacer 500A is located further to the one side in the longitudinal direction than the heating roller 81A. The second spacer 500B is located further to the other side in the longitudinal direction than the heating roller 81A.

Figure 14A:
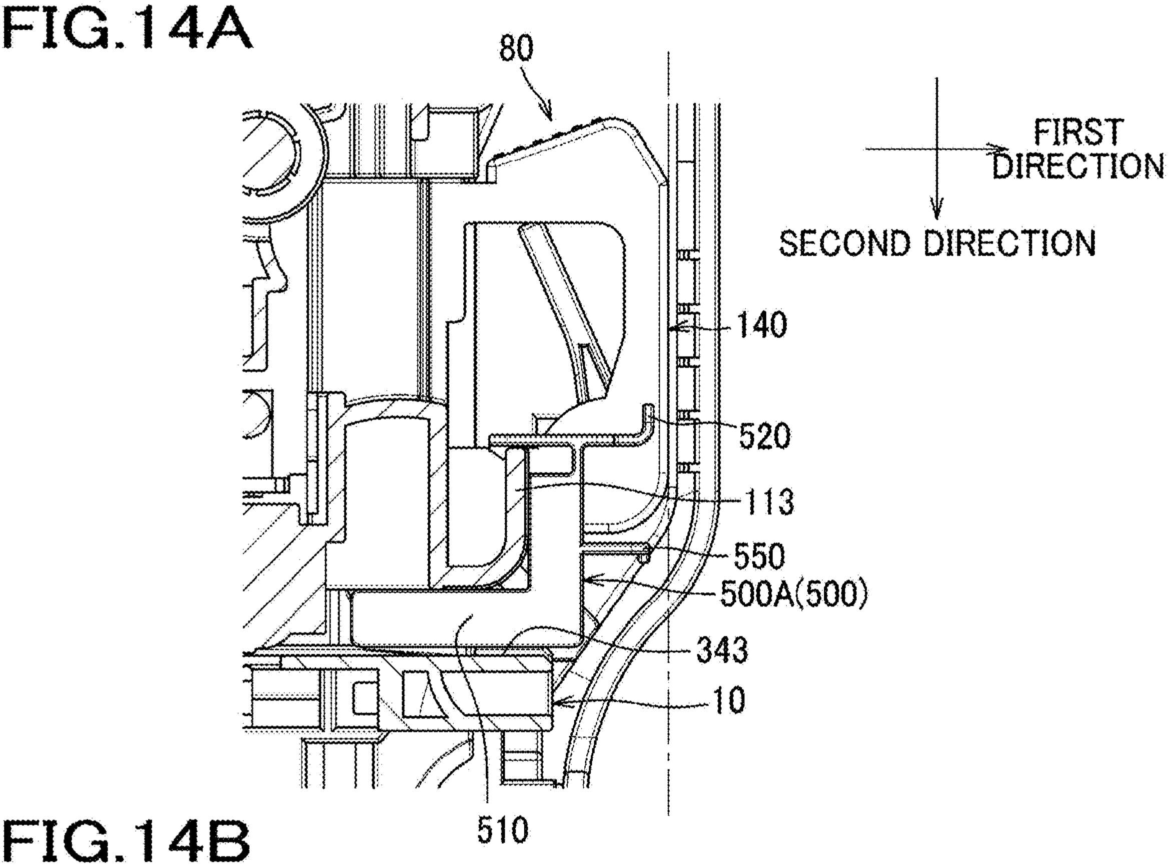
FIG. 14A is a partial cross-sectional view taken along line A-A of FIG. 13.
Figure 14B:
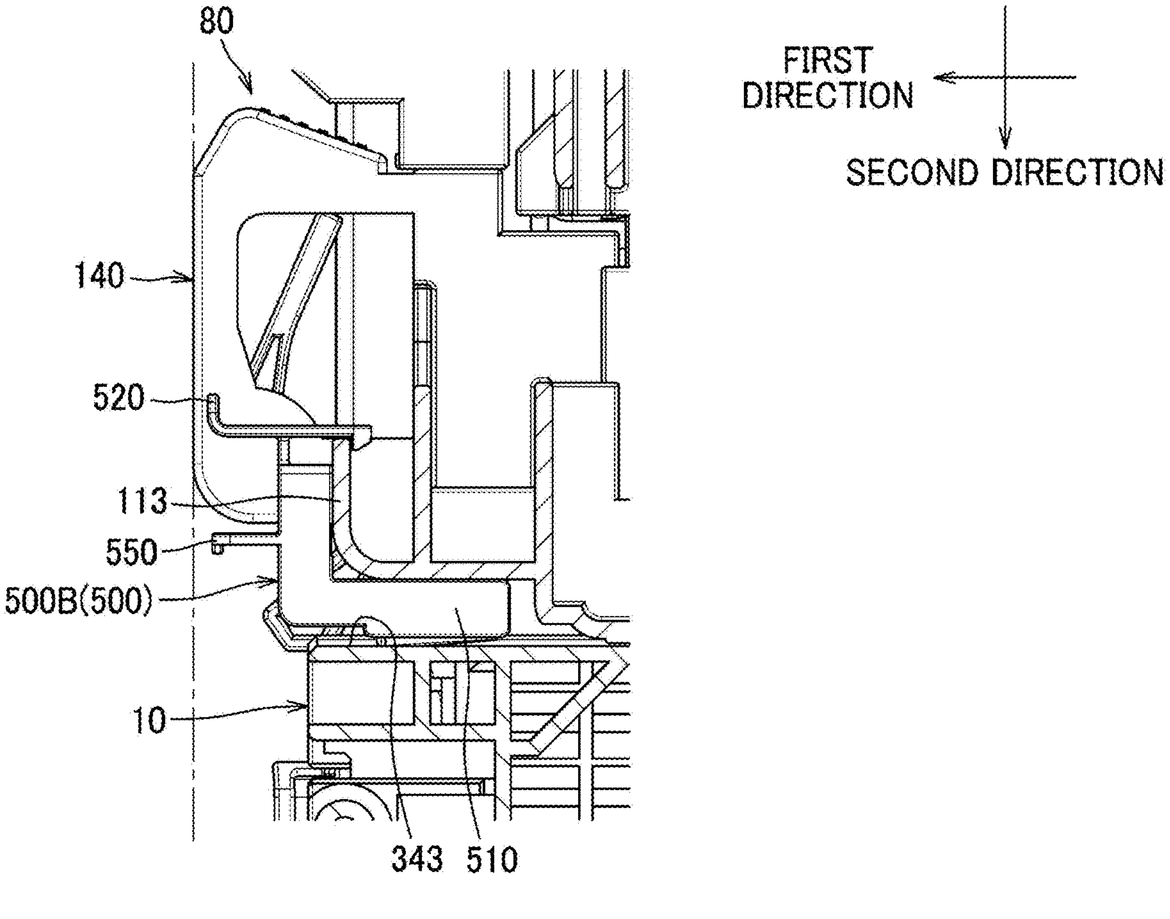
FIG. 14B is a partial cross-sectional view taken along line B-B of FIG. 13.

As shown in FIGS. 14A and 14B, the spacer 500 attached to the main housing 10 does not protrude further to the one side in the first direction than the handle 140 as viewed in the longitudinal direction. Specifically, as shown in FIG. 14A, the first spacer 500A does not protrude further to the one side in the first direction than the handle 140 as viewed from the other side in the longitudinal direction. Further, as shown in FIG. 14B, the second spacer 500B does not protrude further to the one side in the first direction than the handle 140 as viewed from the one side in the longitudinal direction.

Next, functions and advantageous effects of the present embodiment will be described.

Since the handle 140 has the first inclined surface 144, the handle 140 can be easily moved toward the one side in the second direction and easily pulled from the other side to the one side in the first direction by applying a force on the first inclined surface 144 when removing the fixing device 80 from the main housing 10. Thus, operability in the process of installing and removing the fixing device 80 can be improved. Specifically, operability in the process of removing the fixing device 80 can be improved.

Since the handle 140 is fixed to the fixing housing 110, the entire fixing device 80 can be rotated and/or moved in the first direction by operating the handle 140.

Since the positioning boss 120 of the fixing device 80 enters the recess 320 of the main housing 10 in a state where the fixing device 80 is located in the first position, the fixing device 80 can be restrained from moving relative to the main housing 10 in the state where the fixing device 80 is located in the first position. Since the fixing device 80 is movable in the first direction relative to the main housing 10 after the fixing device 80 is rotated from the first position to the second position, the fixing device 80 can be removed from the main housing 10 in a state where the fixing device 80 is located in the second position.

Since the handle 140 includes the grip 141, a user can place his/her hand on the grip 141 to operate the handle. Thus, operability in the process of installing and removing the fixing device 80 can be improved.

Since the second guide surface 312, which is located between the first guide surface 311 and the recess 320, is inclined such that an edge of the second guide surface 312 on the one side in the first direction is located further to the one side in the second direction than an edge of the second guide surface 312 on the other side in the first direction, the first guide surface 311 and the recess 320 can be located approximately at the same position in the second direction. Thus, the posture of the fixing device 80 while the positioning boss 120 is being guided by the first guide surface 311, and the posture of the fixing device 80 after the positioning boss 120 enters the recess 320, i.e., after installation of the fixing device 80, can be made approximately the same.

Since the handle 140 has the second inclined surface 145, a force from the one side to the other side in the first direction can be exerted on the positioning boss 120 while the positioning boss 120 is pressed against the guide surface 310 by applying a force on the second inclined surface 145 when installing the fixing device 80 into the main housing 10. Thus, operability in the process of installing and removing the fixing device 80 can be improved. Specifically, operability in the process of installing the fixing device 80 can be improved.

Since the lock lever 150 is provided on the handle 140, the lock lever 150 can be operated when operating the handle 140.

Since the rotation axes 81X, 82X of the heating roller 81A and the pressure roller 82A, which account for a major portion of the weight of the fixing device 80, are located between one end and the other end of the handle 140 in the second direction, the handle 140 can be operated smoothly in the process of operating the handle 140 and installing and removing the fixing device 80.

Since the tapered portion 132 of the pivot boss 130 has a tapered shape, the pivot boss 130 can be guided into the groove 330 when installing the fixing device 80 into the main housing 10. The fixing device 80 can thereby be easily installed into the main housing 10. Further, since the pivot boss 130 has a tapered shape, the main housing 10 can be downsized compared to an alternative configuration in which an inclined surface for guiding the pivot boss into the groove is provided at the inlet of the groove. Thus, the image forming apparatus 1 can be downsized.

Since the shaft portion 131 of the pivot boss 130, which functions as a center of rotation of the fixing device 80, has a cylindrical surface 131A, the fixing device 80 can be rotated smoothly relative to the main housing 10.

Since the positioning boss 120 enters the recess 320 when the fixing device 80 rotates relative to the main housing 10, the fixing device 80 can be restrained from moving in the first direction relative to the main housing 10 after the positioning boss 120 enters the recess 320.

Since the leading edge 132A of the tapered portion 132 enters the groove 330 in the process of the positioning boss 120 being guided by the first guide surface 311, the pivot boss 130 can be reliably placed in the groove 330 when the fixing device 80 moves along the first direction. After at least a portion of the pivot boss 130 enters the groove 30, the fixing device 80 rotates in the process of the positioning boss 120 being guided from the first guide surface 311 to the second guide surface 312 and entering the recess 320. Thus, the fixing device 80 can be rotated stably.

Since the main housing 10 has the first restriction surface 341 and the second restriction surface 342, the fixing device 80 can be restrained from moving in the second direction by the first restriction surface 341 and the second restriction surface 342. The pivot boss 130 can thereby be reliably placed in the groove 330.

Since the leading edge 132A of the pivot boss 130 is located closer to the first surface 332 than to the second surface 133 in a state where the fixing device 80 is installed in the main housing 10, a space will be left for allowing the fixing device 80 to rotate in a direction in which an end of the pivot boss 130 on the other side in the first direction moves closer to the second surface 333.

Since the position of the positioning boss 120, which is located further to the other side in the first direction than the pivot boss 130, is different from the position of the pivot boss 130 in the second direction, the positioning boss 120 can be restrained from entering the groove 330 by mistake in the process of installing the fixing device 80 into the main housing 10.

Since the image forming apparatus 1 comprises the spacer 500, the fixing device 80 can be restrained from moving in a direction in which the positioning boss 120 moves out of the recess 320. Thus, when the image forming apparatus 1 is, for example, transported with the fixing device 80 installed in the main housing 10, the positioning boss 120 can be restrained from moving out of the recess 320, and the fixing device 80 can thereby be restrained from moving out of an installation position.

Since the pivot boss 130, which functions as the center of rotation of the fixing device 80, is located further to the one side in the first direction than the positioning boss 120, and the spacer 500 is located further to the one side in the first direction than the pivot boss 130 to restrain the fixing device 80 from rotating, the spacer 500 can be downsized. In addition, by attaching the spacer 500 between the end of the main housing 10 on the one side in the first direction and the end of the fixing device 80 on the one side in the first direction, rotation of the fixing device 80 in the direction in which the positioning boss 120 moves out of the recess 320 can be restrained and the spacer 500 can thereby be downsized.

Since the spacer 500 includes the insertion portion 510, rotation of the fixing device 80 in a direction in which the positioning boss 120 moves out of the recess 320 can be restrained by a simple configuration, i.e., the insertion portion 510 inserted between the opposing portion 113 of the fixing device 80 and the main-housing-side opposing portion 343 of the main housing 10.

Since the spacer 500 includes a rib 540 that protrudes from the insertion portion 510 by an amount of protrusion that decreases as the rib 540 extends from the one side to the other side in the first direction, the insertion portion 510 can be easily inserted between the opposing portion 113 and the main-housing-side opposing portion 343. If the insertion portion 510 is forced in between the opposing portion 113 and the main-housing-side opposing portion 343, the spacer 500 will not easily fall out from between the opposing portion 113 and the main-housing-side opposing portion 343.

Since a plurality of ribs 540 are provided side-by-side in the longitudinal direction, the insertion portion 510 can be restrained from tilting in the longitudinal direction. Thus, the spacer 500 can be restrained from tilting in the longitudinal direction.

Since the spacer 500 includes a lock portion 520 that restrains the insertion portion 510 from falling out from between the opposing portion 113 and the main-housing-side opposing portion 343, the spacer 500 can be restrained from falling out.

Since the spacer 500 is located further outward in the longitudinal direction than the heating member 81, the spacer 500 can be prevented from being adversely affected by heat generated by the heating member 81 even if a user forgets to remove the spacer 500 and the image forming apparatus 1 is used with the spacer 500 attached thereto.

Since the spacer is a different color than the main housing 10 and the fixing housing 110, a user can easily find the spacer 500 when the spacer 500 is to be removed.

Since the spacer 500 does not protrude further to the one side in the first direction than the handle 140, the spacer 500 and the closed rear cover 13 do not interfere with each other.

Since the lock portion 520 which includes the pawl 522 faces the insertion portion 510 in the second direction, the insertion portion 510 can be inserted between the opposing portion 113 and the main-housing-side opposing portion 343 and the pawl 522 of the lock portion 522 can be engaged with the opposing portion 113 when attaching the spacer 500. That is, the spacer 500 can be attached easily.

Since the lock portion 520 includes the first extension portion 523 and the spacer 500 includes the second extension portion 550, by pinching and pulling the first extension portion 523 and the second extension portion 550, the insertion portion 510 can be pulled out from between the opposing portion 113 and the main-housing-side opposing portion 343 with the pawl 522 of the lock portion 520 disengaged from the opposing portion 113 when removing the spacer 500. That is, the spacer 500 can be removed easily.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the spacer 500 is configured such that the lock portion 520 engages the fixing device 80 in the above-described embodiment, the spacer 500 may be configured, for example, such that the lock portion 520 engages the main housing. Specifically, the spacer may be configured such that the pawl of the lock portion engages the main housing. Further, the spacer may not include the lock portion.

Although the spacer 500 is configured such that the rib 540 contacts the main-housing-side opposing portion 343 of the main housing 10 in the above-described embodiment, the spacer may be configured, for example, such that the rib contacts the opposing portion of the fixing device. Although the spacer 500 includes a plurality of ribs 540 in the above-described embodiment, the spacer may, for example, include only one rib. Further, the spacer may not include any ribs.

In the above-described embodiment, the first spacer 500A and the second spacer 500B are both located outward of the heating member 81 in the longitudinal direction. However, one of the first spacer and the second spacer may be located outside the extent of the heating member in the longitudinal direction, and the other of the first spacer and the second spacer may be located within the extent of the heating member in the longitudinal direction. The first spacer and the second spacer may both be located within the extent of the heating member in the longitudinal direction. Further, any number of spacers may be provided, including one.

Although the spacer 500 is a different color than the main housing 10 and the fixing housing 110 in the above-described embodiment, the spacer 500 may, for example, be the same color as at least one of the main housing and the fixing housing.

In the above-described embodiment, the spacer 500 does not protrude further to the one side in the first direction than the handle 140, as viewed from the longitudinal direction. However, as long as the spacer does not interfere with the closed cover, the spacer may, for example, protrude further to the one side in the first direction than the handle as viewed from the longitudinal direction.

Although the direction of insertion of the insertion portion 510 is the same as the first direction (the front-rear direction of the image forming apparatus 1) in the above-described embodiment, the direction of insertion of the insertion portion may, for example, be a direction different from the first direction. Specifically, the direction of insertion of the insertion portion may be a direction inclined upward or downward relative to the front-rear direction or may be the lateral direction.

Although the perpendicular direction is the second direction in the above-described example, the perpendicular direction may, for example, be the longitudinal direction.

In the above-described example, the image forming apparatus 1 is configured such that a portion of the pivot boss 130 enters the groove 330 in the process of the positioning boss 120 being guided by the first guide surface 311 when the fixing device 80 is being installed into the main housing 10. However, the image forming apparatus may, for example, be configured such that the whole pivot boss enters the groove in the process of the positioning boss being guided by the first guide surface when the fixing device is being installed into the main housing.

Although the lock lever 150 is located on the handle 140 in the above-described embodiment, the lock lever may, for example, be located on the fixing housing. Further, the lock lever may be provided on the main housing. In this case, the image forming apparatus may, for example, be configured such that the handle is operated after operating the lock lever to release the lock.

Although the handle 140 is fixed to the fixing housing 110 in the above-described embodiment, the handle may, for example, be movable relative to the fixing housing. For example, the handle may be rotatable or slidable relative to the fixing housing.

Although the handle 140 has the first inclined surface 144 and the second inclined surface 145 in the above-described embodiment, the handle may, for example, only have the first inclined surface. Further, the handle may, for example, not include either the first inclined surface or the second inclined surface.

Although the pivot boss 130 has a shape that is elongated in the first direction in the above-described embodiment, the pivot boss may, for example, have a cylindrical shape.

Although the recess 320 is recessed toward the one side in the second direction and along the second direction in the above-described embodiment, the recess may, for example, be recessed toward the one side in the second direction and inclined relative to the second direction. Specifically, the recess may be inclined frontward and downward.

Although the image forming apparatus 1 is configured such that the fixing device 80 rotates relative to the main housing 10 so that the positioning boss 120 enters the recess 320 in the above-described embodiment, the image forming apparatus may, for example, be configured such that the fixing device moves linearly in the second direction relative to the main housing so that the positioning boss enters the recess.

Although the heating member 81 comprises the heating roller 81A in the above-described embodiment, the heating member may, for example, comprise a heating belt or a heating film in place of the heating roller. Although the pressure member 82 comprises the pressure roller 82A in the above-described embodiment, the pressure member may, for example, comprise an endless belt and an elastic pad that nips the endless belt in combination with the heating member in place of the pressure roller.

Although the first direction is the front-rear direction of the image forming apparatus 1 in the above-described embodiment, the first direction may, for example, be a direction inclined relative to a horizontal direction.

Although the image forming apparatus 1 is a printer capable of forming a color image in the above-described embodiment, the image forming apparatus may, for example, be a printer only capable of forming a monochrome image. Further, the image forming apparatus may be a copying machine, multifunctional device, etc.

The elements described in the above embodiment and its modified examples may be implemented selectively and in combination.

What is claimed is:

1. An image forming apparatus, comprising:

a main housing; and a fixing device comprising a heating member and a pressure member, the heating member extending in a longitudinal direction, and the fixing device being installable into the main housing in a first direction that is perpendicular to the longitudinal direction from one side in the first direction to another side in the first direction, and removable from the main housing in the first direction from the another side in the first direction to the one side in the first direction, wherein the fixing device further comprises;

a handle at an end of the fixing device on the one side in the first direction, the handle being graspable when the fixing device is being installed into and removed from the main housing;

a positioning boss protruding from the fixing device in the longitudinal direction; and a pivot boss protruding from the fixing device in the longitudinal direction;

the main housing comprises a recess recessed toward one side in a second direction that is perpendicular to the longitudinal direction and to the first direction, the positioning boss is located in the recess in a state where the fixing device is located in a first position in which the fixing device is installed in the main housing, the fixing device is configured to rotate relative to the main housing about the pivot boss from the first position to a second position different from the first position, as an end of the handle on the one side in the first direction is moved toward the one side in a the second direction, the positioning boss is disengaged from the recess and the fixing device is movable in the first direction relative to the main housing, in a state where the fixing device is located in the second position, and the handle has a first inclined surface at an end thereof on another side in the second direction, and the first inclined surface is inclined such that an edge of the first inclined surface on the one side in the first direction is located further to the another side in the second direction than an edge of the first inclined surface on the another side in the first direction in a state where the fixing device is located in the first position.

2. The image forming apparatus according to claim 1, wherein the fixing device further comprises a fixing housing configured to support the heating member and the pressure member, and the handle is fixed to the fixing housing.

3. The image forming apparatus according to claim 1, wherein the handle includes a grip that is graspable and extends in the second direction in a state where the fixing device is located in the first position.

4. The image forming apparatus according to claim 1, wherein the main housing has a guide surface that guides the positioning boss toward the recess when the fixing device is being installed into the main housing, and the guide surface includes:

a first guide surface extending in the first direction; and a second guide surface located between the first guide surface and the recess and inclined such that an edge of the second guide surface on the one side in the first direction is located further to the one side in the second direction than an edge of the second guide surface on the another side in the first direction.

5. The image forming apparatus according to claim 4, wherein the handle has a second inclined surface at the end thereof on the another side in the second direction, and the second inclined surface is located further to the one side in the first direction than the first inclined surface and is inclined such that an edge of the second inclined surface on the one side in the first direction is located further to the one side in the second direction than an edge of the second inclined surface on the another side in the first direction in a state where the fixing device is located in the first position.

6. The image forming apparatus according to claim 5, wherein a dimension of the first inclined surface in the first direction is larger than a dimension of the second inclined surface in the first direction in a state where the fixing device is located in the first position.

7. The image forming apparatus according to claim 1, wherein the fixing device further comprises a lock lever movable between a lock position in which the lock lever is engaged with the main housing to restrain the fixing device from moving relative to the main housing in the first direction and an unlock position in which the lock lever is disengaged from the main housing, in a state where the fixing device is located in the first position, and the lock lever is provided on the handle.

8. The image forming apparatus according to claim 1, wherein the heating member comprises a rotatable heating body that extends in the longitudinal direction, the pressure member comprises a rotatable pressure body that extends in the longitudinal direction, and an axis of rotation of the rotatable heating body and an axis of rotation of the rotatable pressure body are located between one end and another end of the handle in the second direction.

9. An image forming apparatus, comprising:

a main housing; and a fixing device comprising a heating member and a pressure member, the fixing device being installable into the main housing in a first direction that is perpendicular to a longitudinal direction of the fixing device, from one side in the first direction to another side in the first direction, wherein the main housing has a groove extending in the first direction, the fixing device further comprises a pivot boss protruding therefrom in the longitudinal direction, and the pivot boss is configured to enter the groove in a process of the fixing device being installed into the main housing and to be located in the groove in a state where the fixing device is installed in the main housing, the pivot boss has a shape that is elongated in the first direction, and the pivot boss has a first end on the another side in the first direction and a second end on the one side in the first direction, the first end of the pivot boss has a tapered shape with a dimension in a second direction that is perpendicular to the longitudinal direction and to the first direction, and the dimension of the tapered shape in the second direction decreases as the first end of the pivot boss is elongated from the one side in the first direction to the another side in the first direction.

10. The image forming apparatus according to claim 9, wherein the second end of the pivot boss has a cylindrical surface contactable with an inner surface of the groove as viewed from the longitudinal direction, and the fixing device is rotatable relative to the main housing about the second end of the pivot boss.

11. The image forming apparatus according to claim 10, wherein the main housing has a recess that is recessed toward one side in the second direction and located further to the another side in the first direction than the groove, the fixing device further comprises a positioning boss extending in the longitudinal direction, and the positioning boss is located in the recess in a state where the fixing device is installed in the main housing, and the positioning boss is configured to enter the recess as the fixing device is rotated relative to the main housing.

12. The image forming apparatus according to claim 11, wherein the main housing has a guide surface that guides the positioning boss toward the recess when the fixing device is being installed into the main housing, the guide surface includes:

a first guide surface extending in the first direction; and a second guide surface located between the first guide surface and the recess and inclined such that an edge of the second guide surface on the one side in the first direction is located further to the one side in the second direction than an edge of the second guide surface on the another side in the first direction, and when the fixing device is being installed into the main housing:

the fixing device moves along the first direction in a process in which the positioning boss is guided by the first guide surface;

the fixing device rotates in such a manner that the positioning boss moves toward the another side in the second direction in a process in which the positioning boss is guided from the first guide surface to the second guide surface; and the fixing device rotates in such a manner that the positioning boss moves toward the one side in the second direction in a process in which the positioning boss enters the recess.

13. The image forming apparatus according to claim 12, wherein when the fixing device is being installed into the main housing, at least a portion of the pivot boss enters the groove in the process in which the positioning boss is guided by the first guide surface.

14. The image forming apparatus according to claim 10, wherein the groove has:

a first surface extending in the first direction; and a second surface extending in the first direction and facing the first surface in the second direction, and the pivot boss is located between the first surface and the second surface and the first end of the pivot boss is located closer to the first surface than to the second surface, in a state where the fixing device is installed in the main housing.

15. The image forming apparatus according to claim 12, wherein the positioning boss is located further to the another side in the first direction than the pivot boss and in a position different from a position of the pivot boss in the second direction, in a state where the fixing device is installed i the main housing.

16. An image forming apparatus, comprising:

a main housing; and a fixing device comprising a heating member and a pressure member, the heating member extending in a longitudinal direction, and the fixing device being installable into the main housing in a first direction that is perpendicular to the longitudinal direction, from one side in the first direction to another side in the first direction, wherein the main housing has a recess that is recessed toward one side in a second direction that is perpendicular to the longitudinal direction and to the first direction, the fixing device further comprises a positioning boss extending in the longitudinal direction, the positioning boss located in the recess in a state where the fixing device is installed in the main housing, and the image forming apparatus further comprises a restriction element attachable to the main housing and to the fixing device, from the one side in the first direction from outside of the main housing and the fixing device, and removable from the main housing and the fixing device in a state where the fixing device is installed in the main housing, a portion of the restriction element is held between the main housing and the fixing device to thereby restrain the fixing device from moving relative to the main housing toward another side in the second direction.

17. The image forming apparatus according to claim 16, wherein the fixing device further comprises a pivot boss extending in the longitudinal direction and located further to the one side in the first direction than the positioning boss, the fixing device is rotatable relative to the main housing about the pivot boss in such a manner that the positioning boss moves in the second direction, and the restriction element is located further to the one side in the first direction than the pivot boss to restrain the fixing device from rotating.

18. The image forming apparatus according to claim 17, wherein an end of the fixing device on the one side in the first direction includes an opposing portion opposed to the main housing, and the opposing portion-moves closer to the main housing as the fixing device is rotated in such a manner that the positioning boss moves toward the another side in the second direction, and the restriction element includes an insertion portion configured to be inserted and held between the opposing portion and the main housing.

19. The image forming apparatus according to claim 16, wherein the restriction element includes a lock portion that is engaged with the fixing device or the main housing to restrain the insertion portion from falling out from between the opposing portion and the main housing.

20. The image forming apparatus according to claim 16, wherein an end of the fixing device on the one side in the first direction includes an opposing portion opposed to the main housing, and the restriction element includes an insertion portion configured to be inserted and held between the opposing portion and the main housing.

* * * * *